US012272247B2

(12) United States Patent
Ha et al.

(10) Patent No.: US 12,272,247 B2
(45) Date of Patent: Apr. 8, 2025

(54) METHOD, DEVICE AND SYSTEM FOR ALLOCATING A VEHICLE FOR A FLEET SYSTEM BASED ON A USER GROUP

(71) Applicants: Hyundai Motor Company, Seoul (KR); Kia Corporation, Seoul (KR)

(72) Inventors: Jae Jun Ha, Hwaseong-si (KR); Young Jun Moon, Sejong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 514 days.

(21) Appl. No.: 17/408,681

(22) Filed: Aug. 23, 2021

(65) Prior Publication Data
US 2022/0058953 A1 Feb. 24, 2022

(30) Foreign Application Priority Data

Aug. 24, 2020 (KR) .................. 10-2020-0106494
Apr. 13, 2021 (KR) .................. 10-2021-0047551

(51) Int. Cl.
*G08G 1/00* (2006.01)
*G06Q 10/02* (2012.01)
*G06Q 50/30* (2012.01)
*G06Q 50/40* (2024.01)

(52) U.S. Cl.
CPC ............ *G08G 1/202* (2013.01); *G06Q 10/02* (2013.01); *G06Q 50/40* (2024.01)

(58) Field of Classification Search
CPC ............ G08G 1/202; G08G 1/22; G08G 1/20; G08G 1/0965; G06Q 10/02; G06Q 10/0631; G06Q 50/30; B60W 60/0017

USPC ................................................. 701/1
See application file for complete search history.

(56) References Cited

U.S. PATENT DOCUMENTS

| 10,386,192 B1 * | 8/2019 | Konrardy ......... G08G 1/096783 |
| 11,548,531 B2 * | 1/2023 | Marczuk ............ G01C 21/3492 |
| 2016/0090055 A1 * | 3/2016 | Breed .................... B60N 2/067 |
| | | 701/2 |

(Continued)

FOREIGN PATENT DOCUMENTS

| CN | 105292119 B | * | 8/2017 | ............ B60W 30/19 |
| CN | 207028835 U | * | 2/2018 | ............ B60K 15/03 |
| JP | 4515537 B1 | * | 8/2010 | |
| KR | 2016056137 A | * | 5/2016 | ............... F04B 39/10 |

OTHER PUBLICATIONS

Mollah, Muhammad Bager, et al. "Blockchain for the internet of vehicles towards intelligent transportation systems: A survey." IEEE Internet of Things Journal 8.6 (2020): 4157-4185. (Year:2020).*

(Continued)

*Primary Examiner* — Cuong H Nguyen
(74) *Attorney, Agent, or Firm* — SLATER MATSIL, LLP

(57) ABSTRACT

An embodiment method for allocating a moving object for a fleet system includes receiving a use request for the moving object from a user device belonging to a user group, presenting an available moving object list in compliance with the use request, among moving objects belonging to a moving object level corresponding to the user group, and allocating the moving object to the user device according to information of the moving object that is selected by the user device from the available moving object list.

19 Claims, 19 Drawing Sheets

(56) References Cited

U.S. PATENT DOCUMENTS

| | | | | |
|---|---|---|---|---|
| 2016/0171894 A1* | 6/2016 | Harvey | ............... | G05D 1/0088 |
| | | | | 701/23 |
| 2018/0321688 A1* | 11/2018 | Chase | ............... | G05D 1/0297 |
| 2019/0201066 A1* | 7/2019 | Sasaki | ............... | A61B 17/8858 |
| 2019/0281066 A1* | 9/2019 | Simons | ............... | G06F 21/6254 |
| 2020/0265542 A1* | 8/2020 | Matsushima | ......... | G06Q 50/40 |
| 2020/0365023 A1* | 11/2020 | O'Sullivan | ............ | G06Q 10/00 |
| 2020/0377128 A1* | 12/2020 | Marczuk | ......... | G08G 1/096816 |
| 2020/0380631 A1* | 12/2020 | Svitak | ............... | G06Q 30/0645 |

OTHER PUBLICATIONS

Hussain, Rasheed, and Sherali Zeadally. "Autonomous cars: Research results, issues, and future challenges." IEEE Communications Surveys & Tutorials 21.2 (2018): 1275-1313.(Year:2018).*

Lin, Jing-Jie, Shih-Chia Huang, and Ming-Kai Jiau. "An evolutionary multiobjective carpool algorithm using set-based operator based on simulated binary crossover." IEEE Transactions on Cybernetics 49.9 (2018): 3432-3442 (Year:2018).*

Kumar, Bharath Vijaya. "Future Living and Integrated Mobility." (Year:2021).*

Oberti, Franco, et al. "Ext-taurum p2t: an extended secure can-fd architecture for road vehicles." IEEE Transactions on Device and Materials Reliability 22.2 (Year: 2022): 98-110.*

Howson, Sean. "Holistic modelling of car rental sub-problems." (Year: 2021).*

Geromel Dotto, Henrique, and Kristinn Thor Magnusson. "Total cost of ownership optimization model for battery-electric trucks." ( Year: 2022).*

Groeneveld, Rafaël. "Robust safety stock levels determination of a tank container operator, dealing with demand uncertainty in a multi-commodity network setting." (Year: 2021).*

* cited by examiner

| USER | USE STATUS INFORMATION | | EVALUATION INFORMATION | RATING LEVEL |
|---|---|---|---|---|
| | TERM OF CONTRACT (MONTH) | USE PERFORMANCE (HOUR) | | |
| a | 6 | 70 | intermediate | B |
| b | 12 | 80 | excellent | A |
| c | 24 | 160 | excellent | S |
| d | 6 | 55 | intermediate | C |
| e | 18 | 90 | top | A |
| ⋮ | ⋮ | ⋮ | ⋮ | ⋮ |

FIG. 9

| RATING LEVEL | VEHICLE SPECIFICATION | MODEL YEAR (YEAR; RECOMMENDED) | CLEANLINESS (RECOMMENDED) | ALLOCATED ZONE (RECOMMENDED) | LONG-TERM VEHICLE/ DESIGNATED PARKING LOT | PENALTY |
|---|---|---|---|---|---|---|
| S | top~low | 1~2 | A++ | neighboring zone recommended | applicable | exempt |
| A | high~low | 2~4 | A+ | neighboring zone recommended | applicable | exempt |
| B | middle~low | 3~5 | A | neighboring zone irrelevant | non-applicable | applied |
| C | low | 4~6 | B | neighboring zone irrelevant | non-applicable | applied |

\* Recommendation: Basically applied when there is a vehicle corresponding to the item. Check and present lower items in sequence when no corresponding item exists.

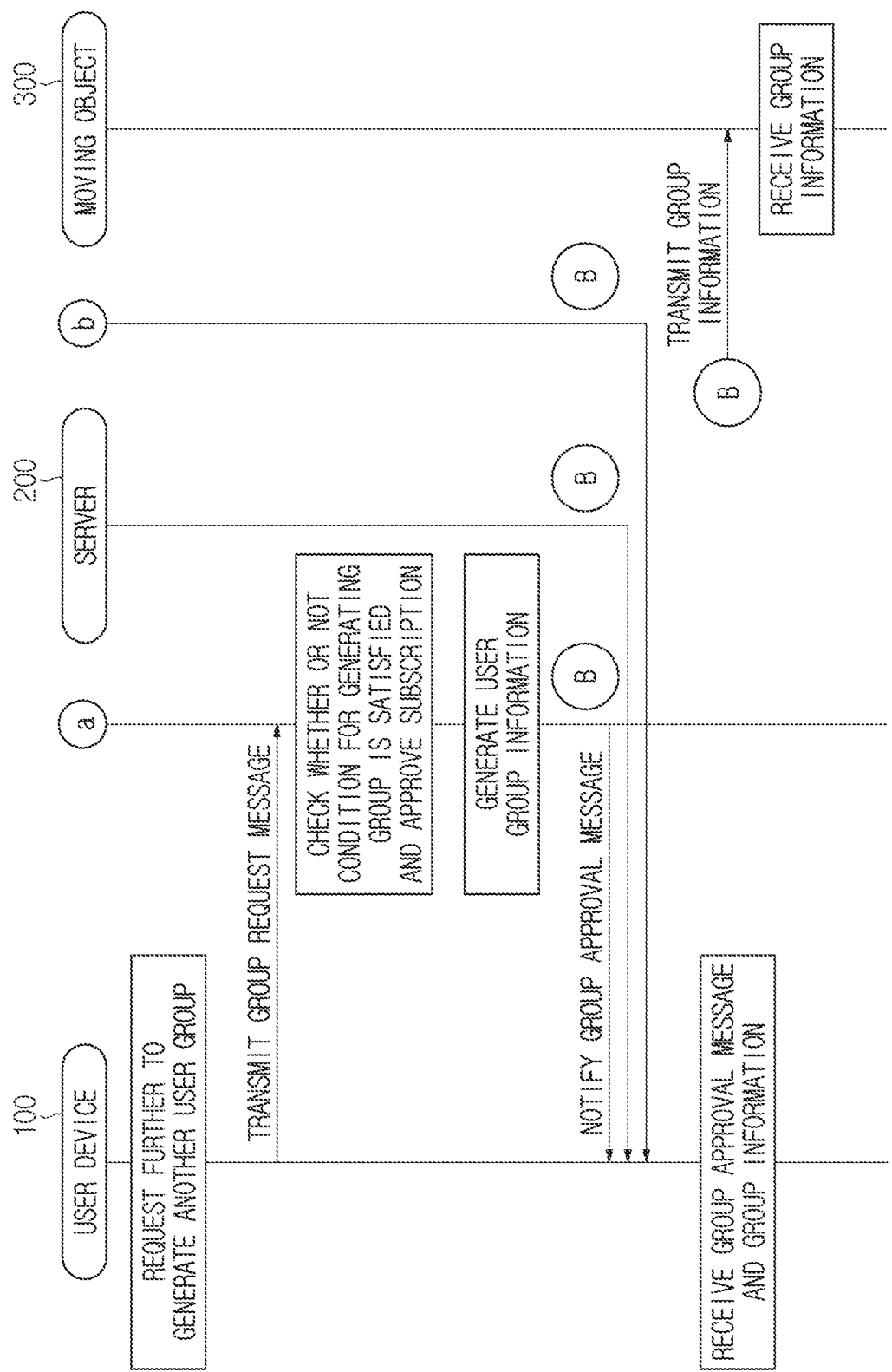

FIG. 11

| USER GROUP | USER MEMBER (RATING LEVEL) | EVALUATION INFORMATION | GROUP LEVEL | BENEFIT/PENALTY INFORMATION (EX. ALLOCATED MOVING OBJECT LEVEL) |
|---|---|---|---|---|
| I | b(A), c(S), e(A) | top | S | AAA |
| II | a(B), d(C), f(B) | intermediate | B | A |
| III | g(A), h(A), i(C) | intermediate | B | A |
| IV | j(A), k(B), m(A) | excellent | A | AA |
| ⋮ | ⋮ | ⋮ | ⋮ | ⋮ |

FIG. 12

| MOVING OBJECT GROUP | MOVING OBJECT TYPE | MODEL YEAR | CLEANLINESS | MAIN COMPONENTS | NUMBER OF ACCIDENTS | ZONE | ALLOCATED MOVING OBJECT LEVEL |
|---|---|---|---|---|---|---|---|
| G1 | medium and small-sized sedans | 1~3 | A+ | fine | 0 | C | AAA |
| G2 | medium and small-sized sedans | 2~4 | B | fine | 1 | C, D | AA |
| G3 | large-sized sedan, SUV | 2~4 | A+ | fine | 1 | A, B, C | AA |
| G4 | large and medium-sized sedans | 2~4 | A++ | fine | 0 | A, B | AAA |
| ... | ... | ... | ... | ... | ... | ... | ... |

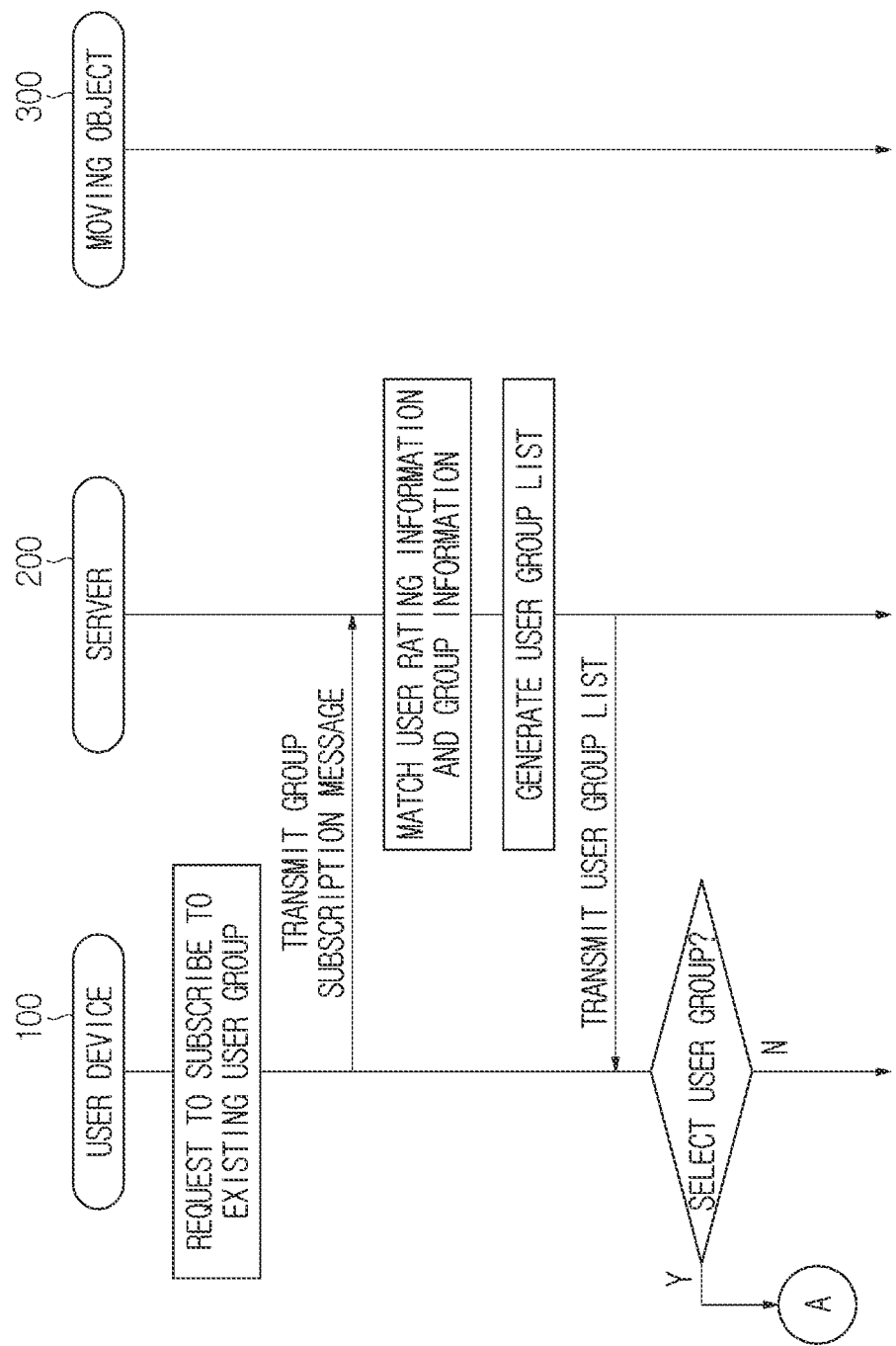

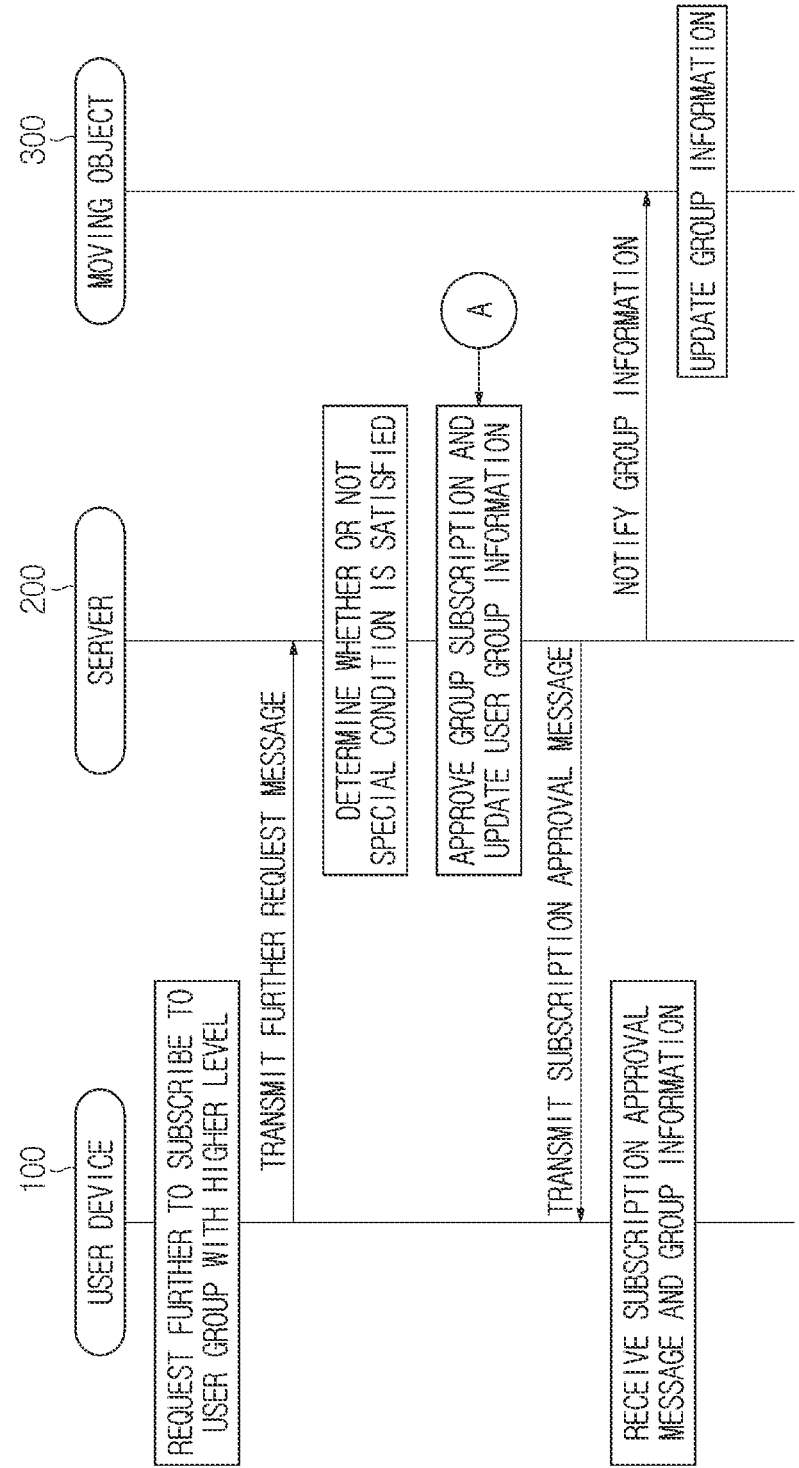

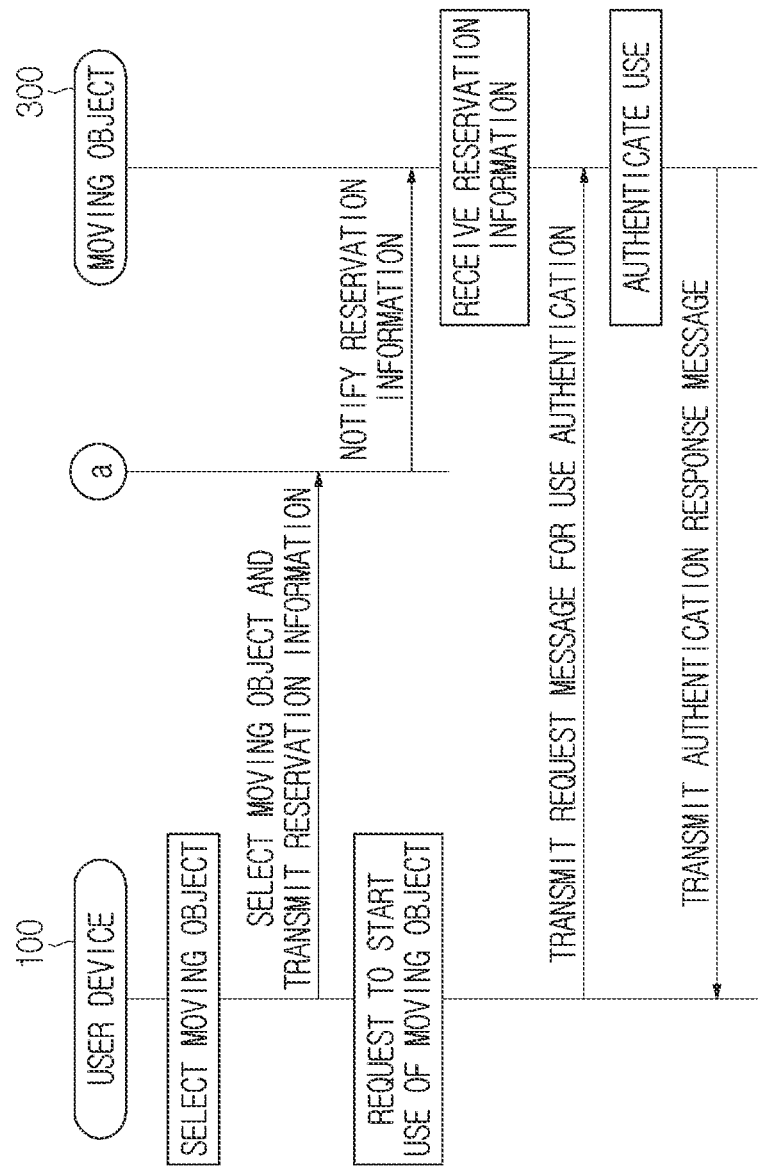

METHOD, DEVICE AND SYSTEM FOR ALLOCATING A VEHICLE FOR A FLEET SYSTEM BASED ON A USER GROUP

CROSS-REFERENCE TO RELATED APPLICATIONS

This application claims the benefit of Korean Patent Application No. 10-2020-0106494, filed on Aug. 24, 2020, and Korean Patent Application No. 10-2021-0047551, filed on Apr. 13, 2021, which applications are hereby incorporated herein by reference.

TECHNICAL FIELD

The present disclosure relates to a method, device and system for allocating a moving object for a fleet system based on a user group.

BACKGROUND

Along with technical advances, the notion of car ownership is being weakened, while the use of shared cars is on the rise. Specifically, for the convenience of everyday life in a particular region or residence, the needs for shared vehicles and related services are increasing. For the smooth use of shared moving objects in an area crowded with users, many moving objects may be kept and managed near the crowded area.

The conventional system, which operates a shared moving object system through a computing device, distributes and manages a small number of shared moving objects at many points.

Recently, as the concept of a smart city emerges, a platform is being developed for providing a convenient service of a facility and a public thing to people who stay mainly in a specific region. For example, a public thing may be a shared moving object, and in order to build an eco-friendly city, residents of a smart city are encouraged to use a shared moving object instead of their own moving objects. Accordingly, a system operating a platform should manage a larger number of shared moving objects than before and for the purpose of efficient management, may operate the platform so that moving objects are concentrated in a region with many residents. As the number of residents and the number of shared moving objects increase, an area for storing shared moving objects becomes wider necessarily. It becomes more necessary for a platform system to allocate shared moving objects, which are dispersed over a large area, so that the moving objects may not be concentrated among zones, and to manage the moving objects in good condition. Especially, as residents of a specific area frequently use moving objects, the condition of moving objects may easily be degraded, and thus user devices' request to use moving objects may drastically decrease. A system may impose a penalty on an individual user by transmitting penalty information like imposition of fines and temporary suspension of use to a device of the user showing poor use. However, as an unnecessary time is spent to maintain a poorly-used moving object, the management efficiency of a system declines, and the frequent occurrence of poor use also degrades the performance of a shared moving object.

Meanwhile, residents may be classified into groups like residence and place of work, and users belonging to a same group may have a similar use pattern. As necessary, users, who want to use a same moving object, may belong to a group and may want to receive a separate management service by a system. However, an existing system does not provide any specialized service based on a user group. Moreover, a user group tends to use a specific moving object. However, when some users of the group poorly use a moving object, other users may not be able to use a specific moving object since they have subscribed to the group. That is, when operating a service based on a user group, a system needs to establish a process for managing a moving object allocated to the group and to construct a data system necessary among user devices belonging to the group, the moving object and a control server.

SUMMARY

The present disclosure relates to a method, device and system for allocating a moving object for a fleet system based on a user group. Particular embodiments relate to a method, device and system for allocating a shared moving object by a fleet system based on a user group.

An embodiment of the present disclosure provides a method, device and system for efficiently allocating a shared moving object by using a fleet system, which is implemented by a computing device, based on a user group so as to meet a user's intention of use and to manage the shared moving object in good condition.

The embodiments of the present disclosure are not limited to the above-mentioned embodiments, and other embodiments that are not mentioned will be clearly understood by those skilled in the art through the following descriptions.

According to an embodiment of the present disclosure, a method for allocating a moving object for a fleet system, which is implemented by a computing device and is based on a user group, includes receiving a moving object use request of a user device belonging to a user group, presenting an available moving object list in compliance with the use request, among moving objects belonging to a moving object level corresponding to the user group, and allocating a moving object according to information of the moving object that is selected by the user device from the available moving object list.

According to another embodiment of the present disclosure, a moving object belonging to the moving object level is set as a moving object belonging to a moving object group exclusive to the user group, the moving object group having the moving object level, and the exclusive moving object group may be partially shared with another user group.

According to yet another embodiment of the present disclosure, information associated with the user group and information associated with the moving object group are recorded or stored in the moving object, and the moving object may provide the information associated with the user group and the information associated with the moving object group to the user device.

According to yet another embodiment of the present disclosure, the presenting of the available moving object list is performed based on user rating information and a user group level, which are assigned to the user device, and when the user rating information is lower than a lower bound of normal use, the available moving object list may be generated by excluding a part of available moving objects belonging to the moving object level.

According to yet another embodiment of the present disclosure, when the use request requests a moving object with a higher level than the moving object level, the following steps may further be included: determining whether or not the user rating information assigned to the user device may use the moving object with the higher level than the moving object level; and presenting an available moving object list including the moving object with the higher level, when the moving object with the higher level is available.

According to yet another embodiment of the present disclosure, the user group includes different benefit information according to each group level, and the benefit information is information available to the user group and may be at least one of moving object type information, moving object state information, and information on a zone for holding a moving object in a fleet spot.

According to yet another embodiment of the present disclosure, the following steps may further be included: receiving a generation request of the user group; determining a user group level and a moving object level based on rating information assigned to user devices, which are selected as candidates of the user group, and authenticating the user group; and notifying information associated with the authenticated user group to the user device.

According to yet another embodiment of the present disclosure, the receiving of the generation request of the user group may receive information on a user, who will subscribe to the user group at a request of the user device, and the rating information.

According to yet another embodiment of the present disclosure, the generation request may further include use type information on a use method of the moving object.

According to yet another embodiment of the present disclosure, in the receiving of the generation request of the user group, when it is determined that the number of users, who will subscribe to the user group at the request of the user device, is less than a minimum number, the following step may further be included: generating user group recommendation information including other users than the user, who will subscribe to the user group, and presenting the information to the user device.

According to yet another embodiment of the present disclosure, the authenticating of the user group may further include determining an at least partially exclusive moving object group in compliance with the moving object level, and the notifying to the user device may further include transmitting the information associated with the user group to the exclusive moving object group.

According to yet another embodiment of the present disclosure, the following steps may further be included: receiving a subscription request for the authenticated user group at a request of another user device; determining whether or not the another user device performs processing of a special condition for subscribing to the authenticated user group, when a level assigned to the authenticated user group is higher than rating information assigned to the another user device; and transmitting group subscription authentication information to the another user device, when it is determined that the another user device performs the processing.

According to yet another embodiment of the present disclosure, after allocating the moving object, the following steps may further be included: receiving a use end request of the moving object; generating evaluation information based on evaluation basis information received from at least one of the moving object and the user device; updating rating information assigned to the user device based on the evaluation information and use status information on a use condition of the moving object; updating a level of the user group according to the updated rating information; and modifying the information associated with the user group according to the updated level of the user group and notifying the modified information to at least one of the user device and the moving object.

According to yet another embodiment of the present disclosure, the evaluation basis information includes at least one among use severity data of the moving object, after-use cleanliness data of the moving object, maintenance data of the moving object, accident data, and evaluation data of a subsequent user. The data of the evaluation basis information is detected or recorded by the moving object. The use status information may include contract information of a user registered in the fleet system.

According to yet another embodiment of the present disclosure, the information associated with the user group includes benefit information, and the benefit information may have at least one of moving object type information, moving object state information, and a zone for holding a moving object in a fleet spot.

According to yet another embodiment of the present disclosure, a step of providing the information associated with the user group to a user device not belonging to the user group may further be included. Herein, the information provided to the user device not belonging to the user group may be summary information, and the information provided to a user device of the user group may be detailed information.

According to yet another embodiment of the present disclosure, the following steps may further be included: generating evaluation information for a user of the user group; producing examination data of the user based on the evaluation information and use status information on a use condition of the moving object; based on the examination data, determining whether the rating information reaches an upgrading or downgrading condition; and notifying to the user device that the user device will be changed to a user group with a lower group level than a current group level, when the downgrading condition is reached.

According to yet another embodiment of the present disclosure, when the upgrading condition is reached, the following step may further be included: transmitting a query message to the user device regarding whether or not to transfer to a user group with a high level, and when the user device consents to be transferred, notifying to the user device that the user device will be changed to the user group with the high level.

According to yet another embodiment of the present disclosure, a moving object belonging to the moving object level is set as a moving object belonging to a moving object group at least partially exclusive to the user group. Herein, the following steps may further be included: checking use state of the moving object based on the evaluation basis information of the moving object; determining whether the use state reaches an upgrading or downgrading condition of a moving object level; and transferring the moving object in a group with a higher level than a level of the current moving object group, when the upgrading condition is reached.

According to yet another embodiment of the present disclosure, when the downgrading condition is reached, a step of transferring the moving object to a group lower than a level of a current moving object group is further included. Herein, a user group using the moving object before the transferring may be set as available after the transferring.

According to another embodiment of the present disclosure, a computing device for a fleeting system allocating a moving object based on a user group may be provided. The computing device includes a transceiver configured to transmit and receive a signal and a processor configured to control the transceiver. The processor is further configured to receive a use request of a moving object from a user device belonging to the user group, to present an available moving object list in compliance with the use request among moving objects belonging to a moving object level corresponding to the user group, and to allocate the moving object to the user device according to moving object information selected, by the user device, from the available moving object list.

According to yet another embodiment of the present disclosure, a fleeting system may be provided which is implemented by a computing device and allocates a moving object based on a user group. The fleet system includes a server configured to manage the fleet system, at least one user device registered to the fleet system, and at least one moving object registered to the fleet system. Herein, the server is further configured to receive a use request of a moving object from a user device belonging to the user group, to present an available moving object list in compliance with the use request among moving objects belonging to a moving object level corresponding to the user group, and to allocate the moving object to the user device according to moving object information selected, by the user device, from the available moving object list.

The features briefly summarized above with respect to embodiments of the present disclosure are merely exemplary aspects of the detailed description below of embodiments of the present disclosure, and do not limit the scope of the present disclosure.

According to embodiments of the present disclosure, a method, device and system may be provided which efficiently allocate a shared moving object by using a fleet system, which is implemented by a computing device, based on a user group so as to meet a user's intention of use and to manage the shared moving object in good condition.

Effects obtained in embodiments of the present disclosure are not limited to the above-mentioned effects, and other effects not mentioned above may be clearly understood by those skilled in the art from the following description.

BRIEF DESCRIPTION OF THE DRAWINGS

FIG. 9 is a view illustrating an example of benefit and penalty according to rating information.

FIG. 10A and FIG. 10B are flowcharts illustrating a method for generating a user group according to an embodiment of the present disclosure.

FIG. 11 is a view illustrating an example of an allocated moving object level available to each user group.

FIG. 12 is a view illustrating an example of a level of a moving object group.

FIG. 13A and FIG. 13B are flowcharts illustrating a process of subscribing to an existing user group.

FIG. 14A and FIG. 14B are flowcharts illustrating a method in which a user belonging to a user group allocates a moving object in accordance with an embodiment of the present disclosure.

DETAILED DESCRIPTION OF ILLUSTRATIVE EMBODIMENTS

Figure 1:
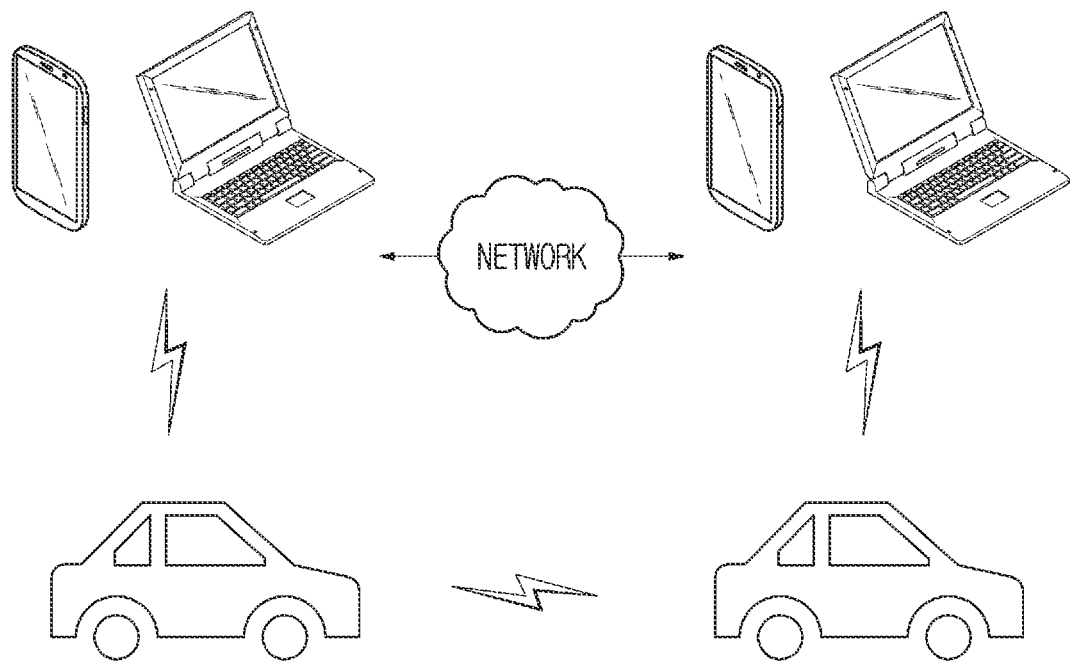
FIG. 1 is a view illustrating that a moving object communicates with another device via a network.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. In addition, parts not related to the description of embodiments of the present disclosure in the drawings are omitted, and like parts are denoted by similar reference numerals.

In embodiments of the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In embodiments of the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In embodiments of the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In embodiments of the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

Advantages and features of embodiments of the present disclosure, and methods for achieving them will be apparent with reference to the embodiments described below in detail with reference to the accompanying drawings. However, the present invention is not limited to the embodiments set forth herein but may be embodied in many different forms. The present embodiments are provided to make disclosed contents of the present invention thorough and complete and to completely convey the scope of the invention to those with ordinary skill in the art.

FIG. 1 is a view illustrating that a moving object communicates with another device via a network.

Referring to FIG. 1, a moving object may communicate with another moving object or another device. Herein, as an example, the moving object may communicate with another moving object or another device based on cellular communication, WAVE communication, dedicated short range communication (DSRC), or other communication schemes. That is, as a cellular communication network, a communication network such as LTE, 5G, WiFi communication network, WAVE communication network, etc. may be used. In addition, a local area network used in a moving object, such as DSRC may be used, and the present disclosure is not limited to the above-described embodiment.

In addition, as an example, for the purpose of security of a moving object with respect to communication of the moving object, a module capable of communicating only with a device inside the moving object and a module capable of communicating with a device outside the moving object may exist separately. As an example, inside the moving object, communication based on the security such as Wi-Fi communication may be performed only for a device within a certain range in the moving object. As an example, the moving object and a personal device owned by the moving object driver may include a communication module for performing communication only with each other. That is, the moving object and the personal device of the moving object driver may use a communication network disconnected from an external communication network. Also, as an example, the moving object may include a communication module for performing communication with an external device. In addition, as an example, the above-described module may be implemented as a single module. In other words, based on a single module, a moving object may communicate with another device, which is not limited to the above-described embodiment. That is, in a moving object, communication may be performed based on various methods and is not limited to the above-described embodiment.

Herein, for example, a moving object may refer to a device capable of moving. As an example, a moving object may be a vehicle (including an autonomous vehicle or an automated vehicle), a drone, a personal mobility, a mobile office, a mobile hotel or a personal air vehicle (PAV). "Personal mobility" may include a moving object including at least three wheels for stable independent driving or a moving object (e.g., a single-wheeled Segway, a two-wheeled Segway, an electric scooter, etc.) that has one or two wheels but is capable of being driven independently by keeping its balance. A personal mobility may use electricity as a power source by means of a battery but is not limited thereto and may utilize any type of power sources capable of moving the mobility. As an example, a personal mobility may mean a means of transportation that may be taken or used by only one user. In addition, a personal mobility may mean a means of transportation that a small number of users may use as a small means of transportation. As an example, not only a single-wheeled Segway, a two-wheeled Segway and an electric scooter but also an electric wheelchair, an electric bicycle and an electric two-wheeled vehicle may be a personal mobility. In addition, a moving object may be any other moving device and is not limited to the above-described embodiment.

Figure 2:
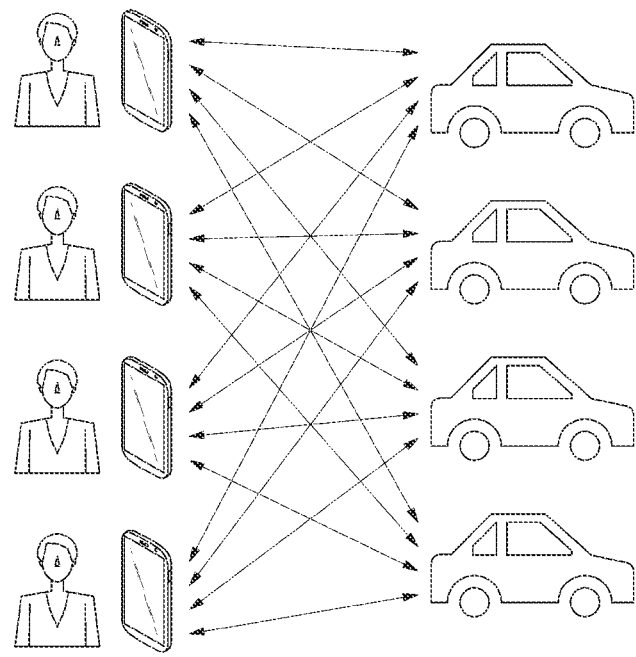
FIG. 2 is a view illustrating that a moving object is shared based on a fleet system.

FIG. 2 is a view illustrating that a moving object is shared based on a fleet system.

As an example, a fleet system may be applied to provide a moving object sharing service. A fleet system may be operated by data generation, processing and exchange between computing devices. For example, a fleet system may be a system including at least one server, a multiplicity of user devices and a multiplicity of moving objects. For a fleet service, a server may process a request of a user device, transmit a response message, and manage a moving object by processing the reservation and allocation/return of the moving object according to the request. Furthermore, the server may generate status information of every moving object by receiving moving object state information from moving objects so that overall information associated with moving objects may be managed.

In addition, a fleet system may be a system including a multiplicity of devices and a multiplicity of moving objects. In addition, as an example, the fleet system may further include a road side unit (RSU) and the like. Herein, a device may be a smart phone, a smart pad and a smart watch. As another example, a device may be a device capable of performing other communication and exchanging a signal, which is not limited to the above-described embodiment. However, for the convenience of explanation, the terms "device" or "user device" will be used in the description below. In addition, as an example, a moving object may be a vehicle. In addition, as an example, a moving object may be an object moving on rails or other constructed areas. As another example, a moving object may be a flying object like a drone. That is, a moving object may refer to an object capable of moving and mean a shared moving object based on a fleet system. For the convenience of explanation, a moving object will refer to a vehicle in the description below. This may be applied to other moving objects in the same way. As another example, a RSU may be a roadside device capable of communication. In addition, as an example, a RSU may refer to a structure installed for transmitting and receiving a signal to and from a building or another area, which is not limited to the above-described embodiment. However, for the convenience of explanation, such structures will be referred to as RSUs in the description below. RSUs may be various structures or devices, which is not limited to the above-described embodiment.

In addition, a fleet system may be a moving object sharing system. A fleet system may be a system in which a moving object is shared in a certain area. Herein, the certain area may be a local concept, such as an apartment complex, a work place, and the like. As an example, the certain area may include an area in an apartment complex or an area a predetermined distance around the apartment complex. As another example, the certain area may mean an area a predetermined distance around the work place. As another example, an area to which a fleet system is applied may be a larger area like an administrative district or a city, which is not limited to the above-described embodiment. That is, the certain area may mean a reference range capable of operation based on a fleet system, and may be changed by a user or a system. In addition, as an example, a fleet system may be a system in which a moving object is shared with a user authenticated as a specific user (or device). As an example, a specific user may be a resident of an apartment in a predetermined range of area or a worker of an office located in a particular region, in which a service of a fleet system may be provided. As an example, the specific user may be a subscriber to a fleet system available in a predetermined service area and be a user outside the service area. Such a user may be a person who wants to use a sharing service when approaching a predetermined service area. As an example, a fleet system may provide a moving object sharing service based on a device that an apartment inhabitant and/or an office worker has registered. Thus, a sharing service may be provided only to a specific person, and the safety and management efficiency of a moving object may be enhanced. However, a specific user using a shared moving object in a fleet system may be determined based on a different method, which is not limited to the above-described embodiment. In a shared moving object fleet system, a shared moving object may be provided. Here, a shared moving object may be a moving object that has been authenticated and approved to be shared by a system. As an example, the shared moving object may be a moving object registered in the fleet system. Here, a fleet system manager may provide a shared moving object for the fleet system. That is, only a moving object authenticated or authorized by the fleet system manager may be used as a shared moving object. Thus, an accident that could occur due to the safety or management of a moving object in a fleet system may be prevented beforehand. Specifically, a moving object to be shared may be registered in a fleet system. A right to register a moving object as a shared moving object in a fleet system may be restricted by the fleet system. Herein, a moving object capable of being registered in the fleet system may have a same ID or same identification information. In addition, as a fleet system provides a shared moving object, the management for the shared moving object may be performed. As an example, the management of a shared moving object may be necessary to provide a shared moving object service, such as residual oil information, moving object state information, or moving object driving information for the moving object registered in a fleet system. Herein, the fleet system may check the state of a shared moving object in real time, and for a moving object having a problem, the permission for use may be restricted or a command of repair may be delivered through the system, based on which a service may be provided.

As another example, a fleet system may provide a mixture of a shared moving object and a privately-owned moving object. As an example, the fleet system may set identification information, such as a moving object ownership indication field, to distinguish a shared moving object provided by the system and a privately-owned moving object. Herein, when the indication field is recorded as a value of not a privately-owned moving object, it may indicate a shared moving object that is not privately owned but is provided by a system provider. On the other hand, when the indication field is recorded as a value indicating a privately-owned moving object, it may indicate there is a moving object privately owned and the moving object is provided as a shared moving object in a fleet system. It is also possible to consider a case in which a privately-owned moving object and a shared moving object provided by a system are mixed. Herein, as an example, the fleet system may provide different services based on a moving object ownership indication field. As an example, in the case of a moving object provided by the fleet system, there may be no restriction of use for a user who uses the moving object. On the other hand, in the case of a privately-owned moving object, there may be a restriction of use. As another example, in a fleet system moving object and a privately-owned moving object, a service may be provided based on different charging systems, which is not limited the above-described embodiment.

As another example, in relation to a specific operation of a fleet system, a service may be provided based on a device registered to the fleet system.

Specifically, the device registered to the fleet system may obtain information on a shared moving object after authentication and security procedures with the system. That is, from the perspective of the device, information on the shared moving object may be provided. Herein, the device may contact the moving object to be used based on the information on the shared moving object.

As an example, there may be a moving object and a device (or users) that are registered to a fleet system. That is, based on authentication and authorization, only specific moving objects and devices may be registered to the fleet system. Herein, the fleet system may be operated based on state information of the registered moving objects and the registered devices. As an example, the fleet system may check information on a moving object currently in use and location information on an individual moving object in real time. Herein, as an example, each moving object may periodically transmit its information to the fleet system. In addition, as an example, each moving object may transmit its information to the fleet system based on an event trigger. As an example, when an event of a change in location or in whether or not to use is triggered to a moving object, the moving object may transmit its information to the fleet system (or server). In addition, the fleet system (or server) may check information on a registered device in real time. Herein, as an example, the registered device may not always use a service of the fleet system. Accordingly, activation information indicating whether a registered device uses a service of a fleet system may be needed. Herein, as an example, the fleet system may include list information for a registered device. Among registered devices included in a list of a fleet system, a device, which is currently using a moving object or activates the system to use the moving object may be provided along with list information. As another example, devices may be indicated by being classified into registered devices (deactivated devices) that do not use a fleet system, registered devices (activated devices) that are using a moving object of the fleet system, and registered devices (temporary devices) that are willing to use a moving object. That is, information may be provided as to whether or not actually in use, whether or not there is willingness to use, and whether or not before use although there is willingness to use. In addition, as an example, for a device using a moving object of a fleet system, usage state information may further be indicated. As an example, usage state information may further include information on expected time of use or information on location of use.

Specifically, a fleet system may include list information on a multiplicity of moving objects and a multiplicity of devices that are registered. Herein, the list information may include at least one or more among usage state information, device location information, and moving object location information. Herein, the fleet system may provide a moving object sharing service based on the device location information and the moving object location information. In addition, the above-described usage state information may include at least one or more among information on a moving object in use, information on expected time of the moving object in use, device-moving object matching information, deactivated device information, activated device information, deactivated moving object information, and activated moving object information. Herein, as an example, the usage state information may further include information on a moving object in use that is being used by another device and information on expected time of the moving object in use. In addition, the usage state information may further include device-moving object matching information based on information in a list form. In addition, the usage state information may include activated device information and deactivated device information. As an example, as described above, the activated device information may be a device that is preparing to use a current moving object among devices registered to a fleet system. As an example, the activated device may mean a device that executes a program or an application for the fleet system. Meanwhile, the deactivated device may be a device that is registered to the fleet system but does not use moving object sharing. As an example, the deactivated device may be a device that does not execute or deactivates a program or application for the fleet system.

In addition, a fleet system may include activated moving object information and deactivated moving object information. In this case, as an example, the fleet system may include state information on a multiplicity of moving objects. Herein, the state information on a moving object may be information on the moving object, such as information on whether or not there is abnormality of the moving object, information on remaining distance to drive, or information on time of refueling. That is, the state information on a moving object may be information for determining whether or not the moving object is capable of being provided for moving object sharing, which is not limited to the above-described embodiment. Herein, the fleet system may determine whether or not to activate the moving object based on the above-described state information. As an example, for a moving object with no abnormality and a sufficient amount of fuel, the fleet system may provide information as an activated moving object. On the other hand, the fleet system may classify a moving object with abnormality as a deactivated moving object. Herein, the fleet system may provide information on the deactivated moving object to an associated system or server. As an example, the associated system or server may perform repair or management for a deactivated moving object, which is not limited to the above-described embodiment.

In addition, a fleet system may manage information associated with a user group and a moving object group. A user group may be a collection of multiple users set to be able to use a moving object with a predetermined moving object level at a request of a user device or a system. A moving object group may be a collection of moving objects that are allocated at the request and are available at least partially exclusively. Information associated with a user group (hereinafter referred to as user group information) may include identification information of a user belonging to the group, a user group level, rating information of each user, a moving object level or information associated with a moving object group (hereinafter referred to as moving object group information), group analysis information, and group authentication information.

Moving object group information may have a moving object level, group identification information, identification/authentication information of a group user, state information of each group user, and rating information of each group user. Moving object group information may be managed and stored in a server. However, when moving objects are designated as an exclusive moving object group, the moving objects may be managed and stored in order to reduce the burden of a server and to ensure security. Specifically, a server may utilize moving object group information by requesting the information to a moving object as necessary, and a user device may receive moving object group information through direction communication with a moving object in use. In addition, even when not using a moving object, a user device may confirm moving object group information from an edge device by requesting to the edge device, not a server, for example, another user device or a moving object of a group via a network. Of course, as direction communication and access by an edge device are performed through a unique authentication process between a user device and a moving object, security may be improved. This is because a moving object of a group belongs exclusively to a user group, so it is possible to block another user's access. In case a moving object manages relevant information, when an abnormal situation occurs to the use state of the moving object belonging to a moving object group, the moving object may be able to quickly notify its situation to a user device and a server.

In addition, as an example, a fleet system may classify a moving object with an amount of fuel below a predetermined level as a deactivated moving object, as described above. As another example, when a moving object with an amount of fuel below a predetermined level is shared through a device, the fleet system may provide a device user with information on the amount of fuel through notification. In addition, as an example, the fleet system may provide a user with information on a designated associated system (e.g., a gas station of a specific brand) and provide information indicating the necessity of refueling. Herein, the fleet system may exchange charging information or other necessary information with a designated associated system regardless of the user, thereby providing a service.

That is, a user using a moving object sharing system may refuel the moving object at a designated place without paying a fee, and the fee may be processed through the fleet system and an associated system. Meanwhile, as an example, as described above, a device (temporary device) willing to use a moving object may want to use the moving object by checking a fleet system.

As an example, a moving object to be used may be allocated to a device through a fleet system. Herein, as an example, the fleet system or server may allocate the moving object to the device by using at least one of information on the moving object in use, location information of the moving object, and location information of the device. Meanwhile, as an example, when the fleet system cannot allocate any moving object, the fleet system may provide the device with information on the failure. In addition, as an example, the fleet system may allocate only a moving object within a predetermined distance from the location of the device, which is not limited to the above-described embodiment. Next, the device may come within the predetermined distance from the moving object. At this time, the device may transmit an authentication signal to the moving object. In addition, as an example, the device may use a shared moving object by tagging the shared moving object based on a list of available moving objects. As an example, the device may tag a moving object based on NFC, Bluetooth, or a magnetic means like a transportation card. Herein, when the device tags a shared moving object, an authentication procedure from the fleet system may be performed to provide the moving object to the device. As an example, when the authentication is completed based on the device tagging, the door of the moving object may be opened.

As for a detailed operation for authentication, when a device approaches a moving object within a predetermined distance, an authentication signal may be transmitted to the moving object. Herein, communication available to the moving object and the device may be Bluetooth, NFC or tag, as described above. That is, a procedure for authentication may be performed under certain conditions, which is not limited to the above-described embodiment. When the device approaches or tags the moving object, the moving object and the device may exchange a signal so that whether or not the device may use the moving object is determined and the device is authenticated. Herein, the device may transmit, to the moving object, an authentication signal including its identification information and identification information of a group in which the device is included. Here, based on the identification information of the device included in the authentication signal thus received, the moving object may verify whether or not the device is registered to a fleet system. In addition, the moving object may determine whether or not the device is included in a group capable of receiving a service from the moving object based on the identification information of the group included in the authentication signal. In other words, based on device identification information and group identification information, a moving object may determine whether or not a device can use the moving object. As an example, when the device is incapable of using the moving object, the moving object may transmit information on unavailability to the device. As an example, the device may obtain the information on unavailability from an application or another service providing program.

Meanwhile, when the device is capable of using the moving object, the moving object may transmit a signal requesting the execution of an authentication procedure to the device. That is, when the device is legally registered to the above-described fleet system (or server) and the moving object is capable of operating legally based on the fleet system, the moving object may transmit the signal requesting the execution of the authentication procedure to the device. Herein, the moving object may also transmit its identification information and encryption key information included in the signal requesting the execution of the authentication procedure. As an example, both the moving object identification information and the device information may be registered to the fleet system. In this case, the moving object may transmit a signal including the moving object identification information, the device identification information, and the encryption key information to the fleet system.

In addition, the device may also transmit a signal including identification information of a moving object, encryption key information and its own identification information, which are included in a signal requesting the execution of an authentication procedure, to the fleet system.

Next, the fleet system may compare information included in the signal received from the moving object and information included in the signal received from the device. Herein, when the moving object identification information, the device identification information, and the encryption key information all agree, the fleet system may recognize that the device is capable of using the moving object. Next, the fleet system may transmit authentication confirmation information to the moving object and the device. Herein, the fleet system may register, to a database, information indicating that the device uses the moving object. In addition, as an example, time for the device to use the moving object and additional information may be continuously transmitted.

In addition, the moving object may register the device based on the authentication confirmation information and may open the door of the moving object. In addition, a lock may be released to use the moving object, whereby the device may control the moving object.

Herein, as an example, when the above-described authentication is completed, the moving object and the device may periodically exchange signals. That is, while the device uses the moving object, the moving object may continuously confirm the use by periodically exchanging signals with the device.

Meanwhile, when there are a user group and a moving object group, the above-described authentication through a server may be similarly applied. As another example, a user device may transmit group authentication information to a moving object, which is allocated so as be used in a moving object group, and thus authentication may be performed between the user device and the moving object. For example, when authentication information of the user device and identification/authentication information of a group user of the moving object correspond to each other, the moving object may notify a use approval message to the user device and transmit a use initiation message to a sever.

Figure 3:
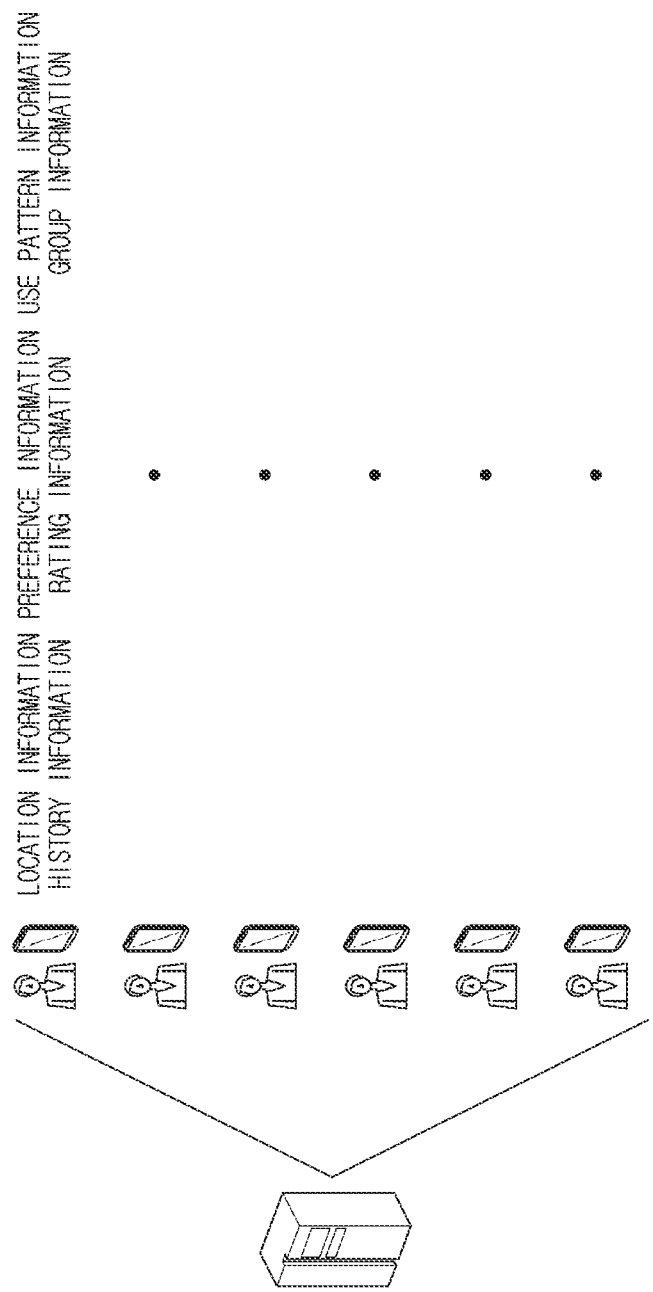
FIG. 3 is a view illustrating that a user is managed based on a fleet system.

FIG. 3 is a view illustrating that a user is managed based on a fleet system.

For example, based on the above description, a moving object and a device may be managed in a fleet system. Herein, as an example, information of each user may be managed in the fleet system. As an example, information of each user may be information on the user's use based on user identification ID or the user's identification device. As a more concrete example, information of each user may include at least one or more among information on the user's location, information on the user's history, information on the user's preference, information on use status, rating information, and use pattern information. As an example, information on the user's location may be information for identifying the user's main route while using a fleet system. As an example, a user's location information may be static location information set by the user like the user's residence and place of work and dynamic location information like location information at time of use request and location information at expected time of use. In addition, as an example, a fleet system may store history information of a user. History information may be information on a user's propensity, which is analyzed based on a type of a moving object used by a user, a zone used in a fleet spot provided to a fleet system, a travel route, a destination point, and a parking point during use. As an example, a fleet system may perform recommendation for the use of a moving object based on a user's history information. In addition, as an example, a fleet system may perform management for allocating and distributing a moving object by using history information of a multiplicity of users. In addition, as an example, a fleet system may include information on a user's preference. As an example, information on a user's preference may be information considering the frequency or preference of a moving object in use. Specifically, preference information may be a type of the moving object that is designated or estimated by the user as a preferred moving object. In addition, as an example, a user's preference information may be information input by the user, which is not limited to the above-described embodiment.

In addition, as an example, a fleet system may provide rating information of a user. Rating information may be rating levels given to each user based on use state information including subscription information for a fleet system and use performance information and after-use evaluation information. As an example, subscription information may be information on whether or not a long-term contract is made as a contract condition for a service of a fleet system and whether or not premium membership is signed up. Use performance information may include a frequency with which a user uses a moving object, a fee according to time or distance, and the like. As an example, when a user frequently uses a moving object, the rating may be raised. In addition, in relation to evaluation information, a rating level may be lowered when a user smokes or causes a bad smell in a moving object and a subsequent user or a manager evaluates poor use or such evaluation is accumulated. In addition, in relation to evaluation information, a rating level may be raised when a moving object is used without an accident or in a continuously good condition so that no unnecessary maintenance work is needed. Evaluation information may be written for each user based on a moving object, which finishes being used, and use state information of the moving object, which is generated from a server.

In addition, a fleet system may provide information on a user's use pattern. Use pattern information may be generated by collecting at least one of life pattern information and riding pattern information for each user. As an example, life pattern information may be generated based on at least one of a user's consumption information, a destination point of a moving object during past use, and a waypoint of the moving object during past use. Riding pattern information, for example, may be configured based on at least one among a zone and a parking lot, which are used by a moving object, an average number of passengers of the moving object, the age and sex of a passenger, and a passenger's body information. By considering use pattern information, a fleet system may determine at least one zone suitable for a user in a large area and may allocate a moving object placed in the zone. In addition, by analyzing use pattern information, a fleet system may determine a fleet spot for return and an optimal parking lot according to a user's use pattern and may notify when reserving a moving object.

In addition, a fleet system may provide group information according to each user group.

A user group may be a collection of users so that a multiplicity of users may actually exclusively use a moving object corresponding to a predetermined moving object level. In order to manage a user group, a fleet system may manage group information that is generated based on information received from a user device and a moving object. User group information may include identification information of a user subscribed to a group, a user group level, identification information of a user belonging to a group, a user group level, rating information of each user, moving object group information, group analysis information, and group authentication information.

A user group level may be determined based on rating information of a multiplicity of users. For example, a fleet system (or server) may determine a temporary group level using an average or minimum score (rating as another embodiment) recorded in evaluation information of rating information and then may determine a user group level by applying a weight for a singularity condition of use status information.

Group analysis information may be information that is obtained by analyzing the above-described individual user's history, preference and use pattern information according to each corresponding group. Group analysis information may be information that is updated when a group user uses an actual moving object, and a fleet system may perform, at a request of a user device, exchange of moving objects belonging to a moving object level or a moving object group, additional allocation of a moving object according to a specific type and a detailed type, modification of a zone holding (parking) a moving object and a parking lot, and processing and modification of cleanliness of a moving object, according to group analysis information.

That is, a fleet system may match a moving object to a user based on various information related to the user. In addition, a fleet system may manage a user based on user-related information.

As an example, the above-described various information may be stored in a server controlling a fleet system and be managed. As another example, at least some of the above-described information may be installed in a moving object or be stored in an identification device capable of tagging or in a user device capable of communicating in a system and a moving object. When a moving object is allocated and used by a user, an identification device may be utilized to identify and authenticate whether or not the user is a user making a reservation. An identification device may transmit data for controlling a moving object, apart from for authentication, to the moving object and a fleet system (server). For example, by storing rating information of a user, an identification device may apply benefit information and penalty information (hereinafter, abbreviated as benefit and penalty respectively) according to a rating level of the user to the control of a moving object. In addition, an identification device may detect a user's poor use through a sensor installed in a moving object, store evaluation information determined in real time, and transmit the information to a server. The server may update evaluation information. In addition, an identification device may collect life pattern information like the real-time travel path, destination point and waypoint of a moving object in real time and transmit the information to a server so that the server may update life pattern information or change a zone of return or a parking lot that is designated at the time of reservation. In addition, an identification device may obtain riding pattern information different from at the time of reservation in real time and transmit the information to a server so that the server may update riding pattern information or change and control a zone of return and a parking lot, which were designated at the time of reservation.

Figure 4:
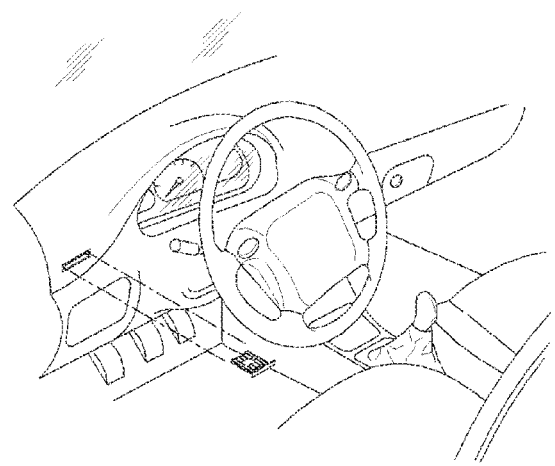
FIG. 4 is a view illustrating an example in which an identification device is applied to a moving object.

The form of the above-described identification device is illustrated in FIG. 4. FIG. 4 is a view illustrating an example in which an identification device is applied to a moving object.

The identification device may be a device having at least any one or more functions of identifying a user, a control target, and a service target. In addition, as an example, the identification device may be a device having an ID function. In addition, the identification device may be at least any one or more among a smart device, a smart module, a user identification module, and an identification module. That is, the identification device may be a hardware configuration. In addition, the identification device may be a software configuration used for the above-described identification. Herein, as an example, the identification device may be a subscriber identity module (SIM). As an example, a SIM, which is applied as an identification device to a moving object, may be at least one or more of a mobility SIM (M-SIM) and a vehicle SIM (V-SIM). In addition, as an example, the identification device may be a module that is the same as or compatible with an existing SIM, which is not limited to the above-described embodiment.

As described above, an identification device may be applied to a moving object by considering such a case in which the moving object performs communication with an external device. As an example, a user may be recognized through a universal subscriber identity module (USIM) in a user's smart phone, and a service may be provided. Based on what is described above, a moving object may also have an integral identification device card. As an example, as an identification device applied to a moving object, a vehicle SIM may be referred to as VSIM. That is, as an identification device applied to a moving object, a new type of identification device may be applied. As an example, a VSIM may be compatible with a USIM or another SIM. In addition, a VSIM may provide another service by considering a characteristic of a moving object, which is not limited to the above-described embodiment.

As in FIG. 4, there may be a part in a moving object, to which an identification device is applicable. Herein, FIG. 4 is merely an example to which an identification device is applied, and the present invention is not limited to the above-described embodiment. Specifically, as shown in FIG. 4, a part for applying an identification device may exist in a position visually identifiable at the driver's seat of a moving object. Although not illustrated herein, as another example, an identification device may be applied inside the glove compartment of a passenger seat in a moving object. As another example, an identification device may be inserted into a part where a display of a moving object is present, which is not limited to the above-described embodiment, and there may be a slot capable of holding an identification device in a suitable part inside and outside a moving object. As another example, in consideration of the portability of an identification device, the identification device may be embodied in a combined state with a tool key or a car key. That is, an identification device may be installed in a tool key or a car key, and the identification device may be removed from the car key and be used by being installed in a moving object. A tool key or a car key may communicate with a moving object via a local area network (e.g., Bluetooth, Beacon, NFC) and thus perform message exchange and identification. That is, a car key or a tool key reflecting the uniqueness of an individual may be used as an identification device, which is not limited to the above-described embodiment.

As another example, the identification device may be installed through an existing device, which is installed in a moving object. As an example, an existing device (e.g., toll payment terminal, black box) may be installed in a moving object. As another example, an identification device may be recognized through an existing terminal (e.g., USB port, cigar jack socket) included in a moving object.

As another example, an identification device may be applied to any position in a moving object within a range capable of authentication, and the identification device may be applied either as an integrated form or a separate form to a control unit, a communication unit or constitutional parts of the moving object.

Figure 5:
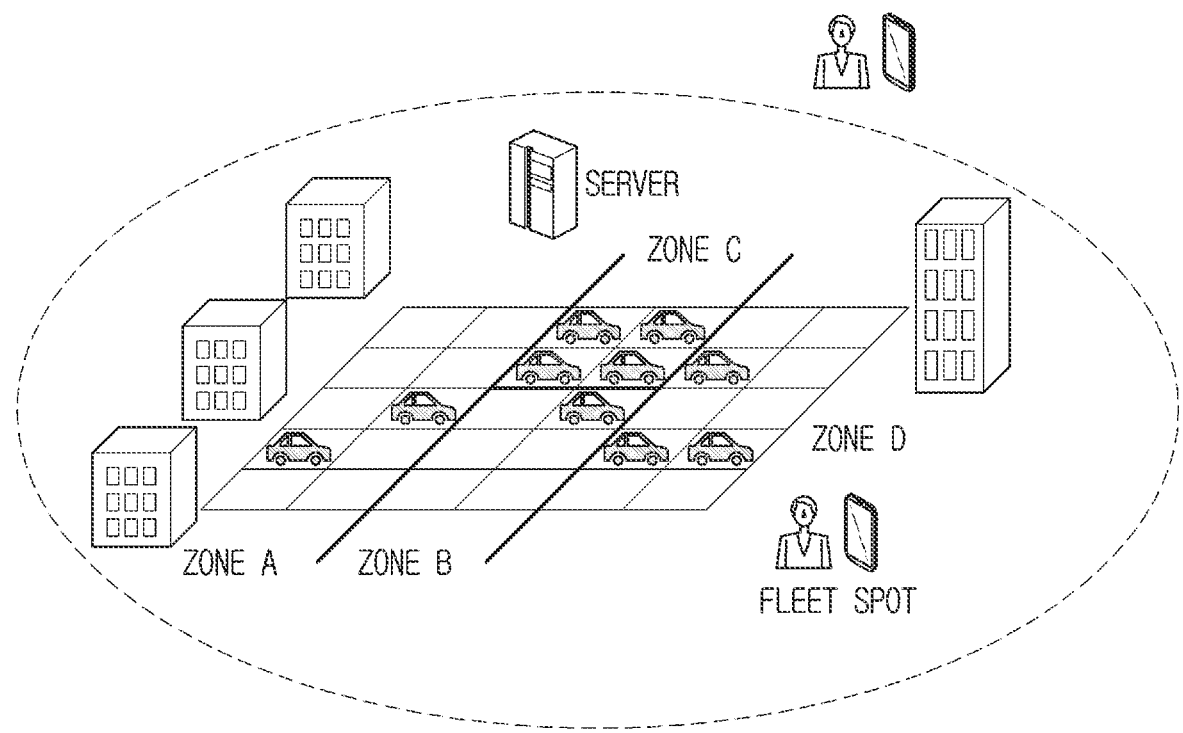
FIG. 5 is a view illustrating an example of a fleet spot.

FIG. 5 is a view illustrating an example of a fleet spot according to an embodiment of the present invention.

A fleet system may have and operate a fleet spot that is a space in which a shared moving object may be allocated and returned. A fleet spot may be a region in which a shared moving object is kept and a service is provided in a predetermined area. As an example, the predetermined area may be located as an area near a region dense with residential districts and/or commercial districts. This aims to enable a fleet system to enhance the convenience of a service for persons using buildings near residential and/or commercial buildings holding many people or a large floating population. People who are likely to use a fleet system include not only inhabitants of buildings but also other people using the fleet system for various purposes like visiting a neighboring area of a fleet spot or transferring to another moving object via the fleet spot.

A fleet system according to the present embodiment may be operated by a small number of moving objects and be operated also by a large number of moving objects for expanding services and ensuring convenience through the fleet system. When being operated by a large number of moving objects, a fleet spot may have a large area of space for holding various types of many moving objects. When a fleet spot is operated in a large area of space, a lot of moving objects may be deployed to be held uniformly across the large space and be deployed by considering a building around the fleet spot, the number of residents, a floating population, and the like. Accordingly, a fleet spot may be divided into a multiplicity of zones, as shown in FIG. 5, in order to efficiently manage many moving objects. A holding area and a parking lot may be allocated to a zone by considering information of the neighboring area of the zone such as a building around a fleet spot, the number of residents, a floating population, and the like. For example, in the case of Zone A near an area dense with commercial buildings, by considering the number of residents of a building, the number of visitors, an expected purpose of a moving object (e.g., outside duty, delivery, non-occupational personal business, etc.) and average use state of a moving object (e.g., cleanliness, frequency of request of light maintenance, long travel, average number of passengers, etc.), small-sized sedans, medium-sized sedans, 7 to 11 seater vehicles and personal mobilities may account for a large percentage of moving objects, while large-sized premium sedans may be allocated at a low percentage. In addition, among small and medium-sized vehicles allocated to Zone A, a larger number of vehicles may have intermediate and excellent levels in aspects like age and cleanliness rather than top level, and as for large-sized premium vehicles, excellent and top levels may account for a larger percentage. As another example, in the case of Zone D near a residential region, moving objects are used mainly for personal purposes like shopping, commuting, riding with family, and many other purposes belonging to personal life styles, and clean use and frequency of requesting light maintenance may be relatively better. Based on this, small to large-sized sedans and 7-to-11-seater vehicles may be uniformly allocated in Zone D, and vehicles with excellent to top levels in age and cleanliness may be allocated to account for a relatively large percentage.

As another example, a maintenance or check-up zone may be allocated among zones of a fleet spot. For example, a fleet system may instruct a user of a moving object to return the moving object not to an original return zone but to a maintenance zone, when the moving object to be returned has no reservation for a predetermined time and the fleet system determines the need of check-up for the moving object or the need of urgent maintenance based on the state information of the moving object, even if there is a subsequent reservation. As another example, when a fleet system determines the need of check-up for a moving object not in use but parked in a non-maintenance zone, the fleet system may move the moving object to a predesignated zone in an unmanned or manned manner. Herein, the predesignated zone may be a place of maintaining and managing a moving object such as a garage, a car wash and a cleaning service for the interior of a moving object.

As another example, a fleet system may manage moving objects by grouping the moving objects in units of a predetermined number. Specifically, at a request of a user device, the fleet system may perform processing to make a moving object allocated to a user group or an exclusively allocated moving object group held mainly in a specific zone of a fleet spot.

In addition, the fleet system may perform maintenance and management for each group of moving objects. In the above-described example, when a maintenance zone is a garage, a car wash and the like, a designated zone (a garage, a car wash and a cleaning service for the interior of a moving object) for maintaining and managing moving objects may be set for each group of moving objects. That is, when the maintenance and management for a moving object is necessary, a fleet system may move the moving object to a designated zone of each group in a manned or unmanned manner, thereby enabling the moving object to be maintained and managed. As the maintenance and management for moving objects is performed in each group of moving objects, as many moving objects as possible may be maintained and managed in a limited time.

As another example, a fleet system may enable quick maintenance and management when a moving object has a check-up time by placing a support unit for maintaining and managing moving objects in each group of moving objects. As an example, the support unit may be a maintenance vehicle placed for maintaining and managing moving objects.

As an example, a fleet system may be operated so that a central server manages moving object state information related to the allocation/return state, location and use state of a moving object and re-allocation of a zone of a moving object for a multiplicity of zones and processes each type of the user information described above. As another example, a fleet system may be operated in a distributed way so that a slave system for each zone is allocated to process and manage a task related to the moving object and a central master server accepts a user's use request and manages a task until the allocation of a moving object in a specific zone and various information of each user. A master server may receive a processing result of a task related to a moving object and update information of each user. Hereinafter, for the convenience of explanation, a central server will be described to process a moving object and information of each user and to manage every zone, but it is not excluded that such processing is performed in a master server and a slave system.

In principle, a fleet system is operated to rent a moving object in a fleet spot and to return the moving object to a corresponding zone and may also be flexibly operated to return the moving object to another zone different from the corresponding zone according to rating information of each user and use pattern information. In addition, a fleet system may permit return to a different type of fleet system by considering a type of premium service used by a user, a temporary request and rating information.

FIG. 5 illustrates that zones are allocated next to each other on the ground surface. However, according to the distribution of neighboring buildings and populations, the zones may be separated from each other within a distance range in which a user may easily move by walking or by means of a personal mobility for a short range. As another example, zones may be set as a multiplicity of zones for each floor of multi-story buildings and facilities in order to enhance the availability of ground surface.

Hereinafter will be described that a fleet system implemented by a computing device allocates and manages a moving object.

A fleet system incorporates an application or program that allocates and manages a moving object and generates and manages various information related to a user. For the convenience of explanation, such applications and programs will be collectively referred to as applications. An application may implement an allocation and management process based on requests and data mutually transmitted among a user device, a shared moving object and a server. Such an application may be embedded in a user device, a shared moving object and a server so that the server may implement the process by obtaining information generated from each computing device. For the convenience of explanation, it is mainly described that a server executes the process. However, for example, in order to secure a storage space of a server memory, data generated by using a moving object may be accumulated in a user device and/or the moving object, and the data thus accumulated until the time of request may be transmitted to the server at the request of the server.

Figure 6:
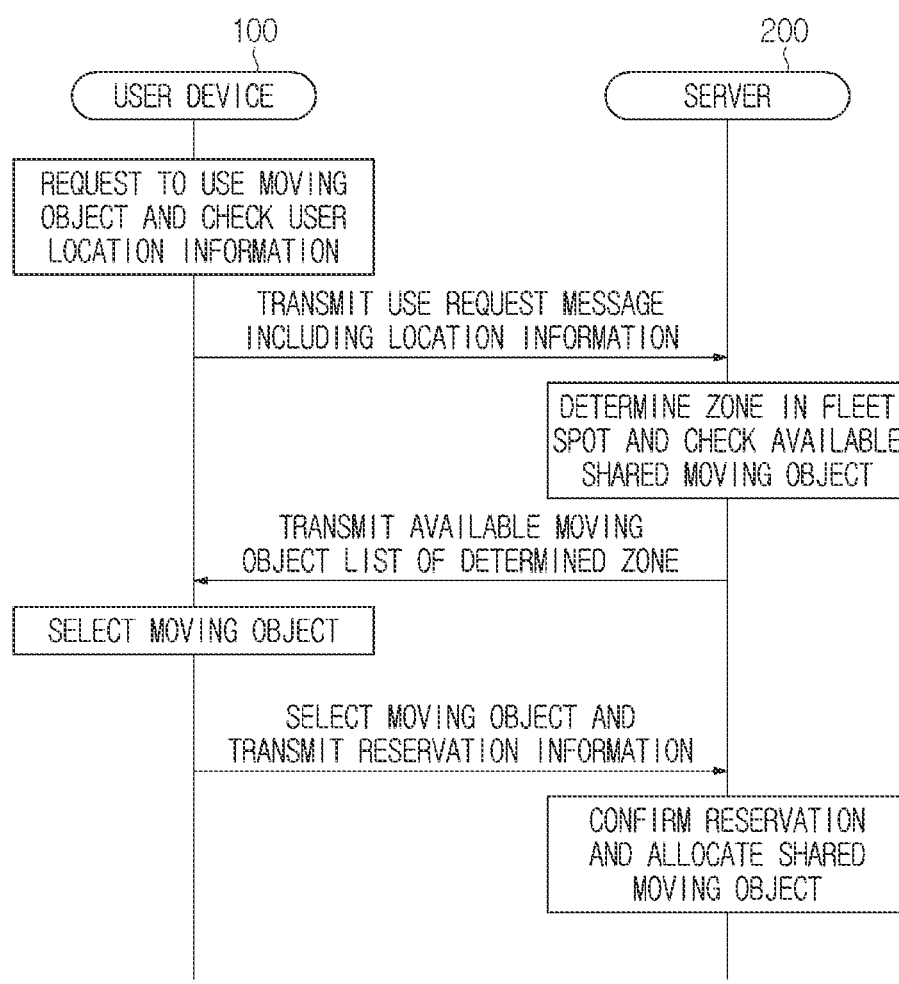
FIG. 6 is a flowchart illustrating a method for allocating a moving object using a fleet system.

FIG. 6 is a flowchart illustrating a method for allocating a moving object for a fleet system at a use request of an individual user.

First, a user device may make a request to use a moving object to a server of a fleet system. As the use request includes at least time to use a moving object, the use request transmitted to the server may be a message that is generated based on the time to use a moving object. As an example, a use request message may be generated by further including a user's location information together with time to use a moving object. As an example, a user's location information may be a residence or a place of work, which the user has registered. In addition, a user's location information may be location information at the time of making a use request, as confirmed by a user device, or location information input as a location in which the user is expected to be present when using a moving object. For example, when a residence or a place of work is set as location information either basically or later, the location information may be determined. As another example, when location information at the time of use request other than a residence or a place of work is selected and is input, the location information may be set as a selected location.

A use request may be a message including, apart from time to use a moving object, at least one among a type of the moving object, history information, preference information and rating information. A type of moving object may be a type of a moving object selected by a user device at the time of request and a detailed type. The type may be sedan-type vehicles with small to large sizes, SUVs, 7-to-11-seater vehicles, vehicles for transporting loads, and personal mobilities. A detailed type may be a brand, a specific model, model year, cleanliness, good maintenance condition, etc. As history information, preference information, rating information and use pattern information were described above, further descriptions are skipped. The user device may set in advance whether or not to include the above-described information through an application and a program that are provided by a fleet system. When set in advance, a use request may be a message based on time to use a moving object and information set in a user device, excluding a user's location information. Even when setting in advance, if the user device further sets or demands at the time of request that a use request message is to be generated by including location information along with the above-described setting information and time of use, the use request message may be generated including all the information described above and may also be generated based on location information requested by a user in preference to the user's estimated location information inferred from the setting information.

Next, the fleet system (or server) may determine at least one zone in compliance with a use request and may check an available moving object list including an available moving object of the zone.

When a use request is a message that is generated by time to use a moving object and a user's location information, the server may check a moving object available at the time of use in each zone by referring to scheduling of use of moving objects and may sort moving objects sequentially from a nearest zone to gradually further zones according to the user's location information among zones in which available moving objects are confirmed. The sorting of moving objects may be set up to a predetermined number of moving objects.

As another example, a use request may be a message that is generated as a combination of location information and other information or as other information without location information, along with time to use a moving object. For example, when location information is not included and other information is at least one of history information and preference information, the server may search use scheduling for a moving object suitable for a moving object type identified in history information and/or preference information and a past/preferred zone of a fleet spot. The server may select an available moving object corresponding to the type in at least one searched zone. Herein, when there is no moving object corresponding to a moving object type and a zone used in the past, the server may match a moving object and a moving object adjacent to the moving object type and the zone used in the past. In addition, when history information further includes at least one of a user's travel route, a destination point and a parking lot during use, the server may generate history information by weighting a travel route, a destination point, and a parking lot, which have occurred more frequently than once. By using the history information thus generated, the server may analyze a user's purpose of using a moving object, for example, whether or not the user has a personal purpose like a long drive, a business trip for visiting an office, shopping or a visit to a house. For example, when an analysis result based on history information is a business trip with a long drive, the server may check relatively recent sedan-type moving objects with middle or low rating and low mileage in every zone. In addition, the server may further consider a moving object type and a zone used in the past. In this case, a zone and a moving object in compliance with the type and the zone used in the past may be selected among moving objects checked based on a purpose of use. Meanwhile, when a zone is determined as a use request is generated as a message combining a user's location information with history information and/or preference information, the user's location information may be set to be preferred to zones in the history information and/or the preference information. Thus, among moving objects checked in history information and the like, the server may select available moving objects from a nearest zone to further zones according to a location of the user's location information.

As another example, other information of a use request may be rating information. A use request may be a message that is generated as a combination of a user's location information and rating information or rating information without location information, together with time to use a moving object. The server may check a benefit and a penalty, which are given to a user making a use request according to a rating level of rating information, and determine a condition for allocating a moving object based on the checked benefit and penalty. For example, the server may determine an available moving object and a zone of the moving object, which meet an allocation condition including the type, specification, model year and cleanliness of a moving object and an allocated zone. As a concrete example, when a user requests a latest sedan with premium specification as a detailed option of a use request, although the user has rating information of a low rating level permitting no premium sedan and not considering allocation of a neighboring zone, the server may not consider the detailed option of the user. Specifically, the server may check available moving objects from sedans with specifications lower than premium level, and when the user's use request overlaps with a use request of another user with a higher rating than the user, the server 200 may determine a moving object of a zone that is not adjacent to the user's location information.

As another example, other information of a use request may be use pattern information. A use request may be a message that is generated as a combination of a user's location information and use pattern information or as use pattern information without location information, along with time to use a moving object.

As described above, use pattern information may be generated by collecting at least one of life pattern information and riding pattern information for each user.

Use pattern information may be set by a user before or at the time of use request and may be generated in a message of use request. In addition, use pattern information may be inferred from driving location information of a moving object, which is obtained according to a user's agreement, the user's data of purchase/trade of goods and services during the time of using the moving object, and boarding information recognizable from communication among an image acquisition device installed in the moving object, an ultra-wide band (UWB), a beacon, Bluetooth, Wi-Fi, identification devices installed in the user device of every driver/passenger and the moving object. Life pattern information and riding pattern information may be inferred based on at least one of driving location information, purchase/trade data, and riding information. For example, driving location information may be a place as a waypoint of a user using a moving object, a destination, parking and stopping places, and the like, which may be a shopping mall, a hospital, and a specific building as the destination of business trip. Purchase/trade data may be a list of goods and services that a user purchases and consumes while using a moving object. The goods may be purchased in a shopping mall, a market, an outlet and a clothing shop, and the services may be medical services and cultural services like film and theater. Life pattern information may be determined based on a list of goods/services that occur with high frequency in recent time of using moving objects. For example, when payment information frequently occurs recently in a large hospital, an orthopedist's office, and other hospitals related to special diseases, life pattern information may be set by applying a weight to a medical service rather than other items with reference to the recent payment information. The use pattern information of a specific user may be determined by comprehensively considering not only payment information but also driving location information, which is confirmed by a recent frequent destination like a hospital, and riding information like old people riding mainly in time of use related to visits to hospitals. Of course, as driving location information, purchase/trade data and riding information are information that vary over time, information on a multiplicity of locations, a list of purchased items and passengers, which are included in use pattern information, may be configured in a ranking order by applying a higher weight to the above-described information obtained through a user's time of recent use than past information.

When a use request is a message including life pattern information, the server may determine an allocation condition of a moving object according to the life pattern information for a user making the use request. For example, as a result of searching for a waypoint and a destination, which a user making a use request has frequently visited in recent days, purchase/trade data and the like, when the server finds that the user has spent much money and purchased a lot of goods in a specific shopping mall and a message includes the shopping mall as an expected shopping location of the use request, the server may determine an available moving object satisfying an allocation condition including a type of moving object, a specification, an age, cleanliness, an allocated zone and the like, and a zone of the moving object. As in the example described above, when life pattern information of a user making a use request purchases a lot of goods in a shopping mall, a server may select an available moving object that is a SUV type with a size capable of loading a lot of goods, is not a latest model but manufactured 3 or 4 years ago and has an intermediate to low level of cleanliness. As a fleet system allocates a moving object so that an allocation zone and a return zone are as identical as possible, the server may select and present the moving object from a nearest zone to a user's residence. Thus, as the user returns the moving object to the return zone near the residence, the user may be able to bring a lot of goods purchased by the user to the residence by taking a short distance.

As another example, as a result of browsing use pattern information of a user making a use request, when a middle-aged driver recently visits a specific hospital with an elderly passenger on a regular basis and there is payment information for hospital services, if time to use a moving object is requested to actually match a period of visiting the hospital, the server may determine, based on use pattern information, an available moving object, which satisfies an allocation condition including the type, specification, model year, cleanliness and allocated zone of a moving object, and a zone of the moving object. In the example described above, the server may select an available moving object of sedan type with medium or larger size, which a multiplicity of passengers may ride in comfortably and has a latest age and an excellent or higher level of cleanliness. For the convenience of use for an elderly passenger, the server may select and present the moving object from a nearest zone as possible to a user's residence.

Next, the server may receive reservation information based on a moving object that the user device selects in an available moving object list.

The available moving object list may be presented by combining a multiplicity of moving objects and zones in which the moving objects are placed. The multiplicity of moving objects are selected by referring to a message including either only time of use in the use request or including, along with the time of use, at least one among a user's location information, a type of the moving object, history information, preference information, rating information, the user's life pattern information and riding pattern information of the moving object.

Next, the server may allocate the moving object to the user device based on reservation information.

Figures 7, 8:
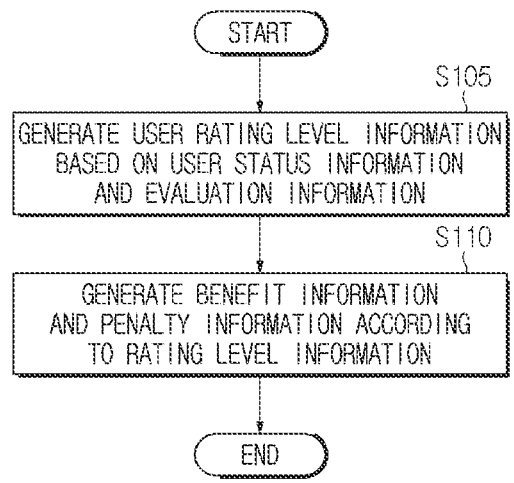
FIG. 7 is a flowchart illustrating a process of determining a benefit and a penalty for each user according to the user's rating information.
FIG. 8 is a view illustrating an example of rating information.

FIG. 7 is a flowchart illustrating a process of determining a benefit and a penalty for each user according to the user's rating information.

A server may assign a user rating level to each user based on the user's use status information and evaluation information that is accumulated whenever using a shared moving object (S105). As also described in FIG. 4, use status information, which is a factor for assigning rating information like a rating level, may include subscription information and use performance information.

FIG. 8 is a view illustrating an example of rating information. At the time of an initial or renewed contract, use status information may consider a term of contract like a short term, a mid term and a long term or may consider use performance of a moving object irrespective of the term of contract. Evaluation information may be generated based on cleanliness after use of a moving object, occurrence of maintenance due to an accident and an improper use of the moving object, and a drastic increase in the degree of wear for components of the moving object due to a user's poor use like sudden stop/speeding. Evaluation information may be produced or estimated by a subsequent user or a maintenance center after the return of a moving object or from the above-described elements sensed by various sensors during/after use which are installed in the moving object. A rating level thus determined may be a discrete rating according to zones, as in FIG. 8, or be assigned as a concrete score.

Next, the server may determine a benefit and a penalty according to rating levels (S110).

As an example, as shown in FIG. 9, the server may determine a policy according to rating levels, and the policy may change according to a user's use pattern, a condition of a moving object and requests of a user and an operator. FIG. 9 is a view illustrating an example of benefit and penalty according to rating information. As shown in FIG. 9, a user with a top rating level of S may be allocated moving objects in a whole range from top-class to low-class specifications. For example, when there is a use request in which a user designates only time of use, the server may set a moving object with a predetermined rating from a top-class specification to be included in an available moving object list among available moving objects at the time of use. When there is no best specification at time of use, it may be determined that moving objects rated next with top-class and middle-class specifications are to be included in the available moving object list. In addition, when there is a use request in which a user corresponding to the rating level of S designates only time of use, it may be determined that a moving object is presented which satisfies as many benefit conditions as possible of age, cleanliness and allocation zone, which are illustrated in FIG. 9, among moving objects with good-class specifications. As indicated by the term "recommended" described in FIG. 9, it is checked whether or not there is a highest rating corresponding to each rating level in each benefit condition. When there is such a highest rating, a moving object corresponding to a benefit of highest rating may be included in a list. When such a highest rating does not exist, a subsequent search is performed for a next highest rating of benefit. A benefit may be related to a direct condition of a moving object like function, model year, cleanliness and the like and may be an additional service for the convenience of a fleet service. Additional services may also be differentiated according to rating levels. For example, when S~A rating levels overlap with a use request of a user who has a lower rating level but is located in a same zone, a moving object of a neighboring zone may be recommended in preference to the user with the lower rating level. Furthermore, a user with high rating level may use a specific moving object, which is frequently used based on history information and preference information, and may designate a parking lot convenient to the user, as necessary. In addition, the server may limit some of the benefits enjoyable at a current rating level by imposing a penalty for a user's poor use and may lower the rating level when the poor use is accumulated. As described in FIG. 6, rating levels may be lowered due to degradation of cleanliness of a moving object, occurrence of maintenance caused by a user's poor use, an increase in the degree of wear caused by the user's severe use, and the like. However, when the server determines a user's poor use, if a degree of idleness such as a time and expense of maintenance work for a moving object, which are caused by the occurrence of maintenance is equal to or lower than a predetermined value, the application of penalty may vary according to rating levels. In addition, when cleanliness degradation and a degree of wear of components are below a reference value of each component, the application of penalty may vary according to rating levels. However, when poor use of a moving object occurs due to a user's mistake, a penalty may be set to be applied irrespective of rating levels.

The description above mainly focused on a case of lowering rating information according to application of a penalty. However, when a user signs a long-term contract and deposits a large amount of money at time of renewal, shows a lower degree of wear than a conventional degree (reference value) of wear for moving object components because of fine use of a moving object compared to other users, and performs activities such as long-time accident-free driving, clean use of moving object and upgrading of cleanliness by cleaning a moving object, the server may not only adjust use status information and evaluation information but also raise a rating level (rating information) based on the above-described activities.

Rating information according to each user affects a group level and an allocated moving object level of a user group according to embodiments of the present invention, and the server may produce evaluation information of the user group based on rating information of each user belonging to the group and determine a corresponding group level.

Figure 10A:
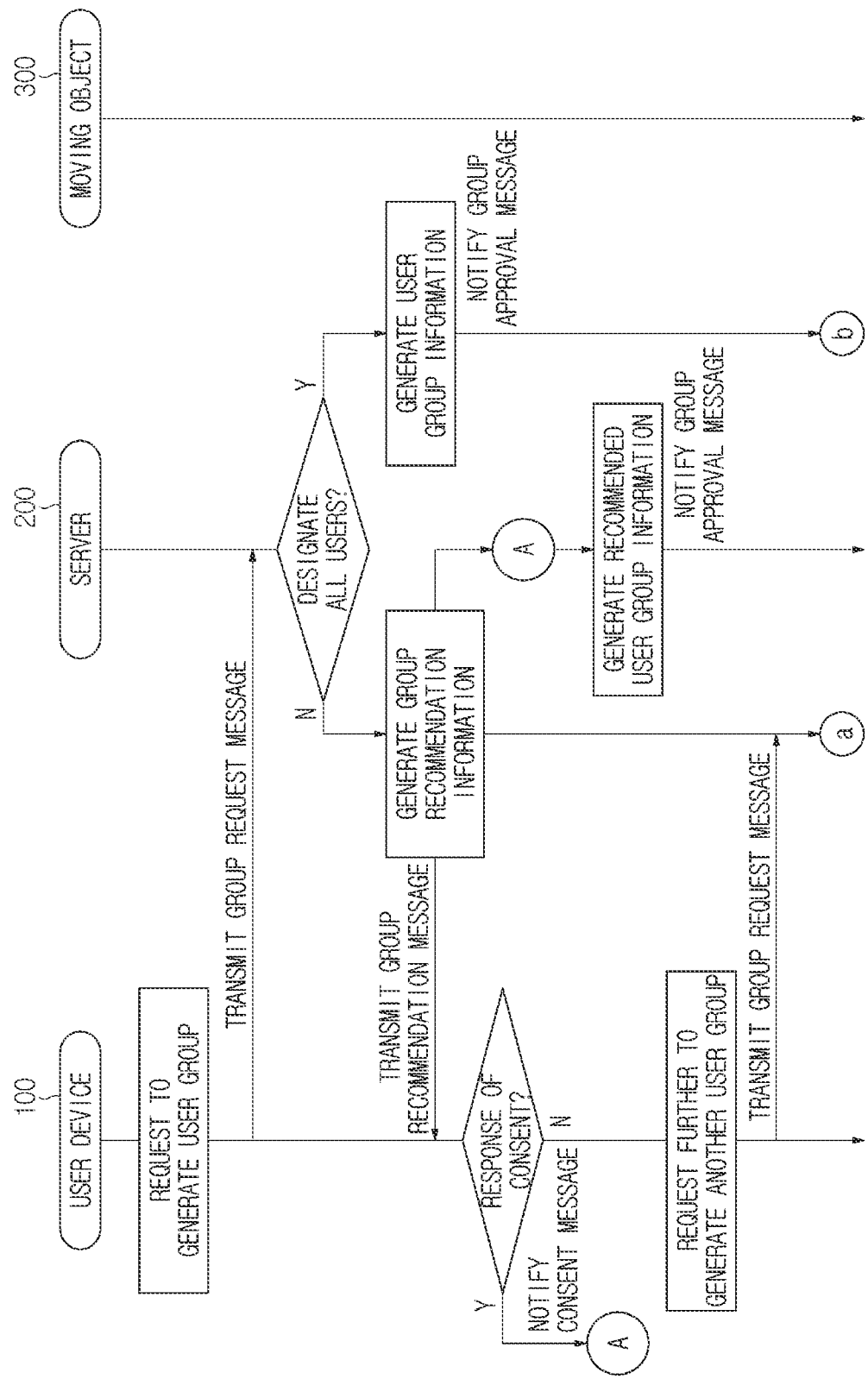

FIG. 10A and FIG. 10B are flowcharts illustrating a method for generating a user group according to an embodiment of the present disclosure.

First, the server 200 may receive a request to generate a user group. In the present embodiment, a group generation process will be described to be implemented mainly at a request of the user device 100.

A message of generation request may be composed of a multiplicity of users designated by the user device 100 and may be generated by one user without any other designated user. A generation request message generated by the user device 100 may be a message that designates a moving object level to be allocated to a group or demands a moving object group including an exclusively available moving object. Designating of a moving object level may be a request to the effect that any moving object corresponding to the level is acceptable, not a request for exclusive use of a specific moving object. Specifically, for more flexible management, a moving object does not monopolize specific moving objects but may set only a moving object range to provide a corresponding user group with a right to be allocated moving objects of the range according to the operating situation of a fleet system. Designating of a moving object level may be a message demanding that a moving object belonging to a moving object level is allocated to be exclusively used by only a user group.

In addition, a generation request message may further include use type information on a method of using a moving object, as detailed request data of a moving object level or a moving object group. Use type information may include data related to a moving object type (type, detailed type and the like), usage state of a moving object, a zone for holding the moving object, a condition of mileage, and a range of benefit and penalty. The data may be generated by being directly input by the user device 100 or be generated at a request of the user device 100 that selects automatic generation based on information on the members of a group. Herein, the information on the members of the group may be history information, preference information, use pattern information and the like, which were illustrated in FIG. 3.

That is, the server 200 may receive user information with the above-described information through a generation request and may receive rating information given to the requesting device 100 or call from the server 200 itself.

When receiving a group generation message, the server 200 may determine whether or not the number of users requesting subscription to a user group exceeds a minimum number, and when the range number of users requesting subscription to a user group exceeds a minimum number, the server 200 may generate information of the user group according to a generation request. Determining whether or not a minimum number is exceeded aims for the advantage and management efficiency related to the actual exclusive use of a moving object. When a moving object is allocated to a user group with a small number of users, utilization of the moving object may be excessively lowered. Accordingly, a fleet system may allocate a moving object for exclusive use to a multiplicity of user groups in order to enhance utilization of the moving object. Thus, as user groups with different levels may use the moving object, a user of a group with a high level may avoid using the moving object and may request an individual moving object as described in FIG. 6. This does not succeed in the reduction of burden of the fleet system, which was expected for the moving object management using a user group, but rather increases the burden.

An embodiment related to the generation of a user group is illustrated in FIG. 11, and FIG. 11 is a view illustrating an example of an allocated moving object level available to each user group.

Referring to FIG. 11, the server 200 may obtain a rating level (rating information) of a group member and then may assign a user group level through a group level evaluation algorithm. A rating level may be determined based on evaluation information and use status information according to each user. In the case of the user group I, since the lowest rating level among users is A and there are many S rating levels, the server 200 may calculate an average of rating levels and assign a group level of S. For another method of calculation, in the case of the group III, although there are many users with A rating level, there is the lowest rating level of C. Accordingly, the server 200 may assign a group level of B according to a minimum rating level. A method of assigning the above-described group levels may be variously established by an algorithm set in a fleet system.

Also, in FIG. 11, benefit information according to a user group level may include at least one of information on a type of a moving object available at the level, moving object state information, and a zone for holding a moving object in a fleet spot. In addition, similar to the description in FIG. 9, the benefit information may further include designation of a parking lot to a user group, exemption of a penalty when an abnormal situation of a moving object is not caused by a user's poor use, and rating information upgrade by a user's activity. For example, the activity may be fine use of a moving object, as compared to other users, or a change of contract condition. Fine use may be a lower degree of wear than a conventional degree (reference value) of wear for a moving object component, accident-free driving for a long time, clean use of moving object or upgrading of cleanliness by cleaning a moving object. A change of contract condition may be a user's depositing a large amount of money, a change to a long-term contract, and the like.

When a user group level is determined, the server 200 may determine a level of an allocated moving object, as described in FIG. 12. FIG. 12 is a view illustrating an example of a level of a moving object group.

Referring to FIG. 12, when matching a user group level with a moving object level, the server 200 may allocate a moving object within a range permissible to a matched moving object level to a user group by referring to use type information according to a generation request. For example, even when moving object levels are equally AAA, the 1st line and the 4th line may have different details. The difference of details is attributable to use type information included in a group generation request. According to details included in use type information satisfying a range permissible to a moving object level, the server 200 may customize an allocated moving object even at a same moving object level. As an additional example, when a moving object group is designated in a group generation request to which the moving object level AAA of the 1st line is assigned, the server 200 may generate a moving object group including a moving object satisfying the details of the 1st line so that the moving object may be used exclusively. Herein, exclusive use may be a setting for including identification information of the moving object in user group information so that the moving object may be provided to an available list at a user's use request. As another example, exclusive use may be using the moving object at least partially exclusively, which is shared only with some user groups with similar levels or sharing users with similar levels.

When a user group level and a moving object level are determined, the server 200 may generate user group information and moving object group information and transmit a group authentication message including these pieces of information to the user devices 100 of every member and the corresponding moving objects 300. When a generation request is designated by a moving object level, the server 200 may transmit group information to all or only some of the moving objects belonging to the moving object level. In case of partial transmission, the server 200 may transmit group information to some of the moving objects 300 belonging to the level by considering at least one among the number of user group members, use type information of group users and history/preference/use pattern that are managed according to each group user. As another example, when a generation request selects a moving object group, the server 200 may generate identification information of moving objects to be utilized as a group by specifying at least some of moving objects belonging to a corresponding moving object level and may transmit group information to the user device 100 and a specified moving object 300.

As group information is transmitted to the moving object 300, information generated according to the use of a group user may be updated in the moving object 300, and direct data processing between the user device 100 and the moving object 300 is also possible so that the processing burden of the server 200 may be reduced. When necessary, the server 200 may manage and process relevant data by requesting group information to the user device 100 and the moving object 300.

Meanwhile, when the number of users requesting subscription in a received group generation message is less than a minimum number, the server 200 may generate and present user group recommendation information, which includes a different user from a user to be subscribed, to the user device 100.

The server 200 may include user information of the different user who belongs to a recommended group and has rating information equal to or lower than a user requesting subscription. The different user may be a user who has requested group generation using a different route from the user requesting subscription. As another example, in case of a use request at a device of a user requesting subscription, when the use request permits user information in compliance with use type information but with lower rating information than the user's rating information, the server 200 may prefer the use type information and include another user in a recommended group.

The server 200 may determine the above-described user group level and moving object level based on user information of a group to be recommended and may transmit a group recommendation message including a recommendation list of at least one or more user groups to both the device 100 of a user requesting subscription and the device 100 of another user.

The user device 100 may select and approve a user group in the list and then transmit an approval message to the server 200. The server 200 may finally determine a user group level and a moving object level in relation to a recommended user group that is selected according to the approval message. As described above, the server 200 may generate user group information and moving object group information, which are related to the recommended group, and transmit a group authentication message including these pieces of information to the user devices 100 of every member and the corresponding moving objects 300.

The user device 100 may transmit a disapproval message, which does not select any user group of the list, or a group addition request message to the server 200. Herein, the disapproval message may be simply non-approval. The group addition request message may request generation of another user group. The additional request message may be a second request made due to generation of a high-level group through a user's activity or a partial change of use type information. For example, an activity may be depositing a predetermined amount of money or changing to a long-term contract. As another example, the server 200 may receive an activity to agree to the joining of a user with low rating information, although users of a user group with a high level gain a disadvantage. Alternatively, the server 200 may consider an activity related to a user's status of using a moving object, propensity and the like occurring during a more recent period than a period for evaluating rating information.

When receiving an additional request message, the server 200 may retrieve user information in compliance with an activity and/or modified use type information that is delivered to the user device 100. In the case of an activity, the server 200 may determine first whether or not a user's rating information is upgraded to a desired user group level and may retrieve user information when the user's rating information can be upgraded. Also, in the case of modification of use type information, whether or not it is a benefit given from rating information of a user requesting subscription is determined first, and user information may be retrieved when the benefit can be given. When adequate user information is retrieved, the server 200 may transmit an inquiry message about subscription to a group to the device 100 of a retrieved user and may receive a message concerning approval of subscription from the device 100 of the retrieved user. When receiving a subscription approval message, the server 200 may authenticate the generation of a user group including the user requesting addition and the retrieved user. In addition, the server 200 may finally determine a user group level and a moving object level based on user information and generate user group information and a moving object group. The server 200 may transmit a group authentication message including these pieces of information to the user devices 100 of every member and the corresponding moving objects 300.

In the above-described embodiment, a user group generation process is initiated at a request of the user device 100. However, in another embodiment, for the convenience of management, the server 200 may request an inquiry of generation of a group consisting of users satisfying a predetermined condition to the user device 100. For example, the predetermined condition according to the embodiment may include at least one among same residence based on user identification information, place of work, similar rating information, similar history, preference and use pattern information. In addition, based on the predetermined condition, the server 200 may determine a moving object level or a moving object group, which may be allocated to the user device 100, and may present a group including members thus determined and moving object information to the user device 100 as recommended group information. The processes of generating information on a recommended group and of approving by the user device 100 may be implemented in an actually same manner as after the step of generating a recommended group candidate illustrated in FIG. 10A and FIG. 10B.

FIG. 13A and FIG. 13B are flowcharts illustrating a process of subscribing to an existing user group.

First, the user device 100 may generate a group subscription message requesting subscription to an existing user group and may transmit the message to the server 200. The group subscription message may provide at least one or more existing user groups in compliance with at least one among rating information assigned to the user device 100, a requested use type, and history/preference/use pattern accumulated according to each device 100 or may be a message requesting to designate a multiplicity of existing user groups and to provide a possible group. Unlike the present embodiment, when the user device 100 specifies one existing user group, the server 200 may determine whether or not it has subscribed to the existing user group, in accordance with the rating information and a special condition of the user device 100.

The server 200 may analyze group information of the existing user group and rating information assigned to the device 100 of a user making a request. The server 200 may transmit a list of matched user groups to the user device 100.

When the user device 100 transmits a message selecting a user group in the list, the server 200 may approve subscription to the selected user group, update user group information and moving object group information and transmit the information to the user device 100 and the moving object 300.

The user device 100 may not select a user group in the list but transmit a message additionally requesting subscription to a user group with a higher level than the assigned rating information to the server 200. The additional request message may include an execution message of a special condition for upgrading rating information.

By upgrading the rating information of the user based on the special condition of the execution condition, the server 200 may determine whether or not it is possible to subscribe to matching of the user group.

For example, the special condition may be such an activity as depositing a large amount of money, change to a long-term contract and the like. As another example, the special condition may agree to the joining of a user with low rating information, although users of a user group with a high level gain a disadvantage or may consider a user's status of using a moving object, propensity and the like occurring during a more recent period than a period for evaluating rating information.

When determining a user's special condition is satisfied, the server 200 may approve the user's subscription to a user group with a high level. Accordingly, when the users of the user group with a high level agree to gain a disadvantage, a condition for adjusting a group level is satisfied, and evaluation information and an allocated moving object level may be adjusted. As another example, when a user subscribes to a user group with a high level by upgrading rating information, a server may not adjust the rating information (group level) of the user group and a moving object level.

After approving a subscription, the server 200 may update user group information, which reflects the user information of the device 100 requesting the subscription, and moving object group information and then may transmit a subscription approval message including the group information to the user device 100 and a moving object.

When determining a user's special condition is not satisfied, the server 200 may present only a list of user groups permitting a subscription according to current rating information to the user device 100 and may permit a subscription only in the presented list.

Figure 14A:
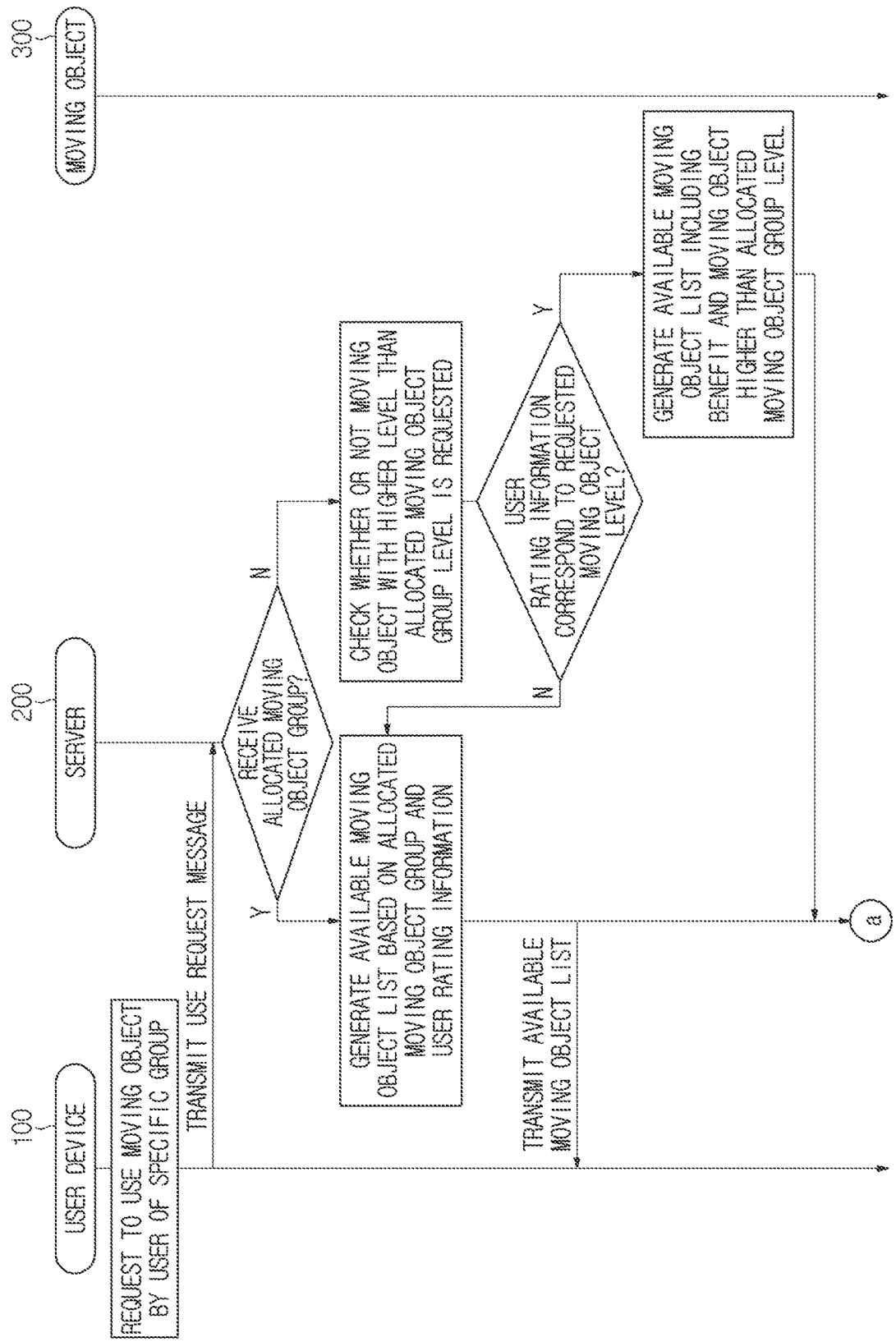

Hereinafter, a method for allocating a shared moving object based on a user group in a fleet system will be described. FIG. 14A and FIG. 14B are flowcharts illustrating a method in which a user belonging to a user group allocates a moving object in accordance with an embodiment of the present disclosure. In the present embodiment, a request to use a moving object will be described to be mainly associated with a moving object allocated to a user group.

First, like FIG. 6, the user device 100 may transmit a moving object use request of a user belonging to a specific user group to the server 200.

For example, a use request may be a message based on use type information that is set through user group information. As another example, a use request may be a message requesting a moving object with a higher level than an allocated moving object level according to a user's situation. As an example, a request for a moving object with a high level may include a moving object type that is not provided by a high-level moving object type or moving object level. As another example, the request may include cleanliness of a moving object, good component condition for long-term/long-distance driving, and allocation or return in another zone that is not provided by a moving object level.

The server 200 may confirm a use request message and obtain moving object state information of an allocated moving object group, a user group level, and rating information assigned to the device 100. The above-described information may be obtained from the server 200, the moving objects 300 belonging to a group, and the device 100. Next, the server 200 may determine whether or not rating information is lower than a lower bound of normal use. This is because rating information may be different between the time of generating a group and the time of use request. For example, a lower bound of normal use may be a rating level which makes a user stay in a user group or a value restricting the use of a moving object with a predetermined rating level or above in an allocated moving object group for such a reason as accumulation of poor use of a moving object, absence of use for a long time, suspended payment, and the like. A moving object with a predetermined rating level or above may be better than a moving object with a low level with respect to moving object type, moving object use state, allocation/return zone, and penalty exemption.

When rating information is equal to or above a lower bound of normal use, the server 200 may transmit a list of all the available moving objects in compliance with a use request to the user device wo. Since an allocated moving object level corresponding to a use request is a moving object that is allocated to a corresponding user group at least partially exclusively, the server 200 may allocate a multiplicity of moving objects having a specification, model year and cleanliness, which belong to the allocated moving object level, to the user device wo. As another example, by considering history information, preference information and use pattern information for a moving object of a user group having a similar group level, the server 200 may give a user group with a similar group level a right to be allocated a moving object belonging to an available moving object range. Furthermore, when a moving object designated in a moving object group is not available, the server 200 may include a moving object available in another moving object group in a list. In addition, a fleet system may assign more benefits to a user group than to an individual user. For example, a fleet system may stably and preliminarily allocate various moving objects including premium specifications, young age and excellent cleanliness, according to user group levels. Accordingly, when a user belonging to a user group and an individual user have an overlapping use request, the server 200 may transmit an available moving object list including a moving object with good condition in preference to the individual user. In addition, the server 200 may generate and provide a list capable of enjoying the above-described benefits in preference to an individual user with respect to an allocated zone, a parking lot and other benefits in addition to the state of a moving object.

When rating information is lower than a lower bound of normal use, the server 200 may generate an available moving object list excluding some of the available moving objects belonging to a moving object level and may notify the list to the user device 100.

The user device 100 may select the moving object 300 in a transmitted available moving object list and may transmit reservation information to the server 200 and the selected moving object 300. User group information and moving object group information, which are additionally generated as a user uses the specific moving object 300, may be recorded or stored in the moving object. After reservation, the moving object 300 may provide reservation information, use state of the moving object, and information generated during use to a user by communicating with the user device 100.

Meanwhile, when a use request is a message requesting a moving object with a higher level than a moving object group level, the server 200 may determine whether or not a user's rating information is capable of using the moving object with a higher level. For example, the server 200 may compare the rating information of a user illustrated in FIG. 8 with the moving object rating levels illustrated in FIG. 9 and FIG. 12. When the user's rating information is capable of using, the server 200 may provide an available moving object list including a moving object with a higher level than a moving object level according to a user group to the user device 100. In this case, the moving object level may include not only a moving object type but also use state of a moving object, allocation/return zone in a spot, penalty exemption and the like.

Unlike the above-described case, when the user's rating information is not capable of using a moving object with a higher level, the server 200 may transmit an available moving object list according to a moving object level to the user device 100 and may notify a message with a disapproval reason.

When the server 200 and the moving object 300 receive reservation information in the various cases described above, the moving object 300 may transmit a use imminence message by directly communicating with the user device 100 making a reservation. When the use starts, the moving object 300 may be controlled by the user device 100 based on an authentication request and a response between the user device 100 and the moving object 300.

According to the present embodiment, a multiplicity of users belonging to a user group may be members having considerable links among them as they have mostly a same residence, a same place of work and acquaintance. Based on mutual trust, a user group consisting of such members do not poorly use a moving object but keep the moving object clean and try not to use the moving object severely. Thus, as a fleet system may restrain poor use rate of the moving object 300, the management burden of the moving object 300 may be reduced.

Figure 15A:
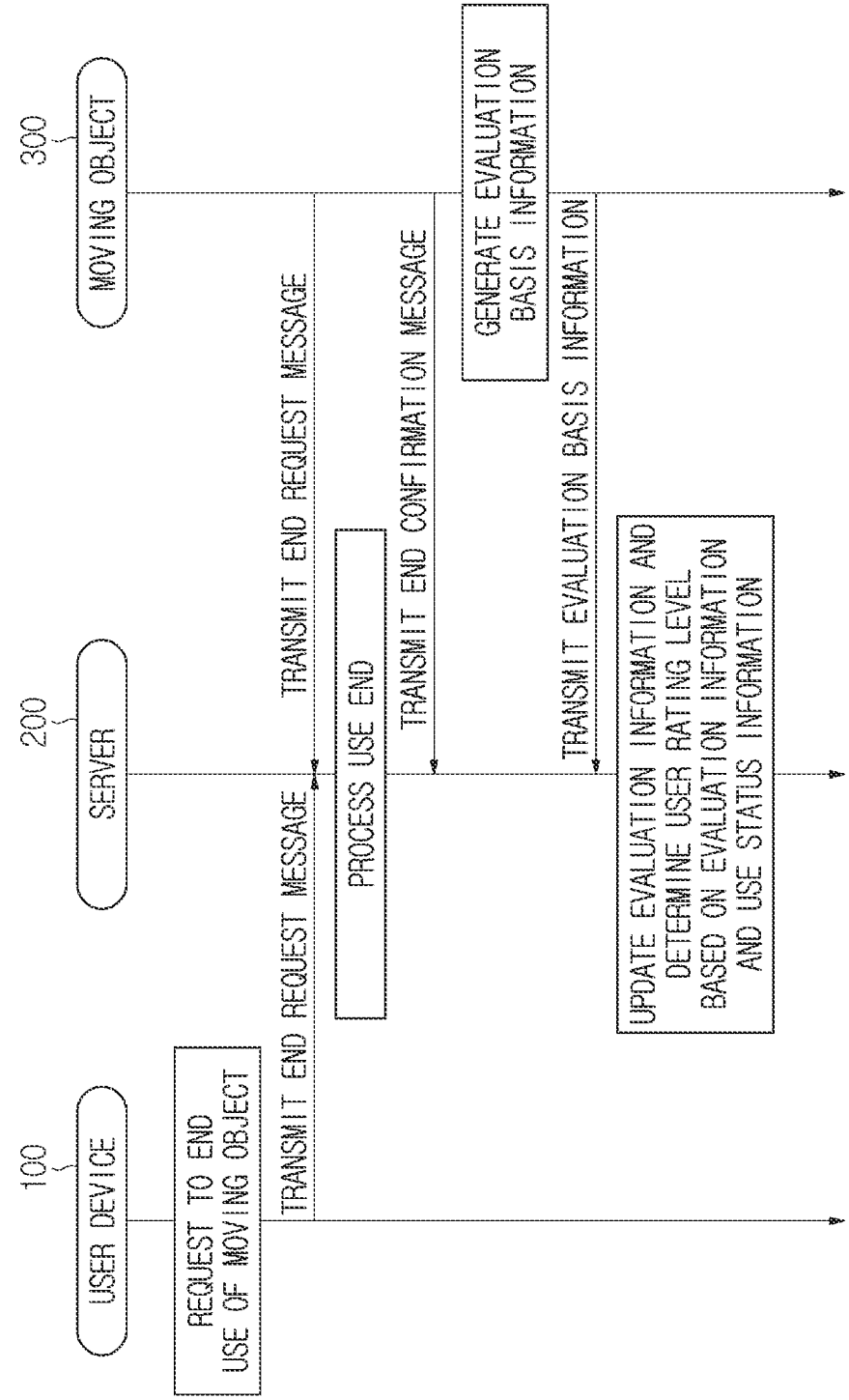
FIG. 15A and FIG. 15B are flowcharts illustrating a process of changing a user's rating information and a user group level, in accordance with an embodiment of the present disclosure.
Figure 15B:
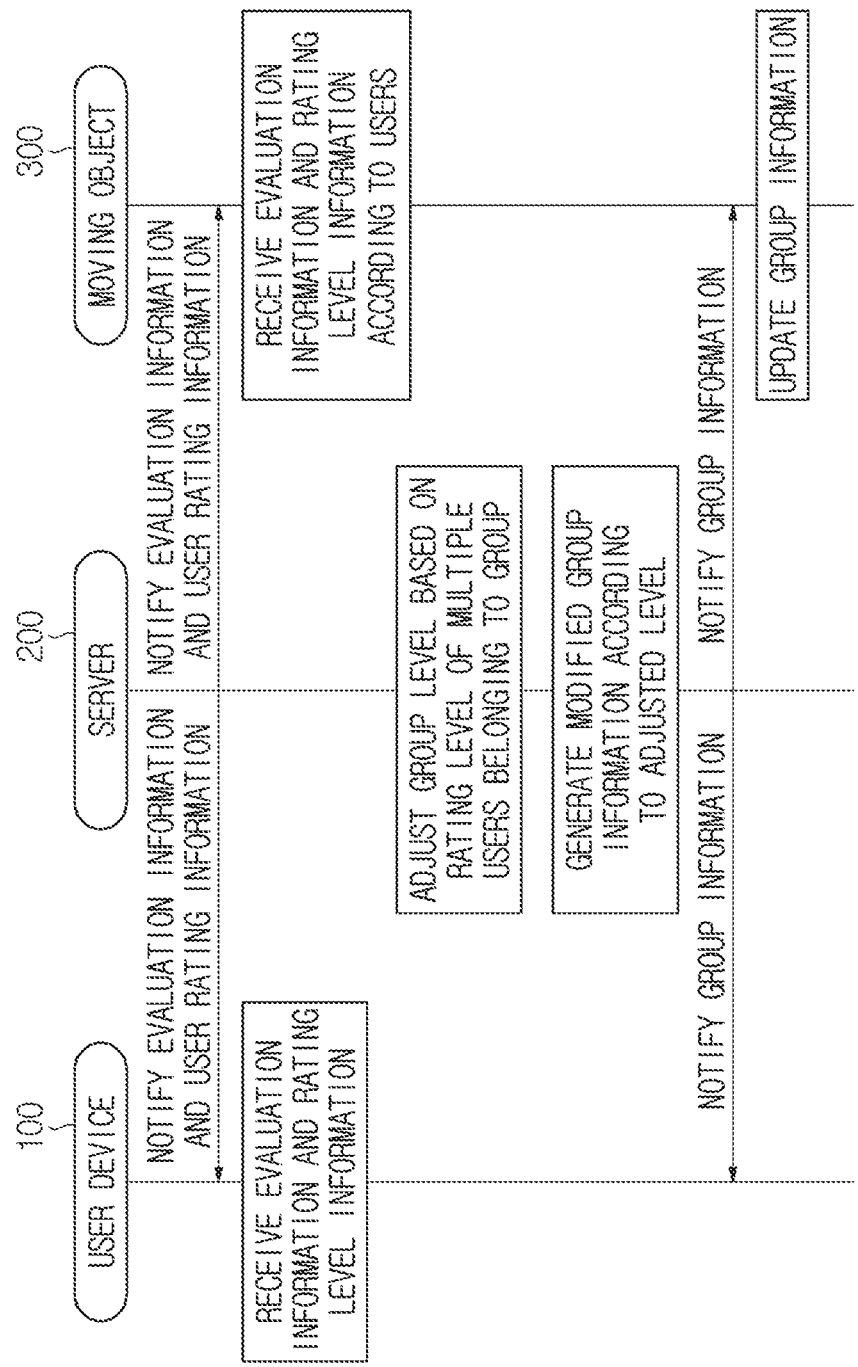

FIG. 15A and FIG. 15B are flowcharts illustrating a process of changing a user's rating information and a user group level, in accordance with an embodiment of the present disclosure.

First, when the user device 100 ends the use of a moving object, the user device 100 may transmit an end request message for the use of the moving object to the moving object 300, which is being used, and to the server 200. According to the end request message, the server 200 may notify an end confirmation message to the moving object 300. When receiving the end confirmation message, the moving object 300 may generate evaluation basis information. For example, evaluation basis information may include at least one among severe use data of the moving object 300, after-use cleanliness data of the moving object 300, after-use maintenance data of the moving object 300, after-use accident data, and evaluation data of a subsequent user. Data of evaluation basis information may be detected or recorded by a sensor installed in the moving object 300, by a camera and based on maintenance data delivered from a maintenance control server. In the present embodiment, evaluation basis information is described to be generated in the moving object 300. However, the user device 100 may also generate evaluation basis information like poor cleanliness, quick payment due to maintenance, and the like and may transmit the information to the server 200.

The server 200 may update evaluation information based on the evaluation basis information. Since evaluation information is illustrated by the example of FIG. 3, a detailed description will be skipped.

The server 200 may determine whether to maintain or change a user's rating information based on updated evaluation information and use status information on a use condition of a moving object and may update the rating information according to a result of the determination. For example, use status information may include a user's contract information registered in a fleet system. Contract information may include not only a term of subscription and long-term deposit but also specific request information for quickly dissolving the suspended use of a poorly used moving object, such as cleanliness, maintenance and other fast-treatment subscription information.

The server 200 may transmit the updated evaluation information and the user's rating information to the user device 100 using the moving object 300 and to the moving object 300. Accordingly, the moving object 300 and/or the server 200 may determine whether or not the moving object used by the user is to be restrictively used.

The server 200 may update a level of a user group by adjusting the level of the user group based on updated rating information (rating level) and a rating level of all the users belonging to the group. In the example of FIG. 11, when most members of the user group I with group level S have their rating information downgraded because of poor use, the server 200 may lower the level of the user group I to a lower level based on rating information of low level that is continuously accumulated.

The server 200 may change user group information and moving object group information according to the adjusted level of the user group and may notify the information thus changed to at least one of every user device to the group and a moving object.

In addition, the server 200 may provide the user group information to a user device not belonging to the user group. Relevant information provided to a user device not belonging to a group may be summary information, and relevant information provided to a user device of the group may be detailed information. In order to protect the privacy of a member of a corresponding group, summary information may exclude sensitive personal information, group use pattern information and group history information and may be limited to moving object information according to moving object levels as in FIG. 12, a distribution of rating information of the group, and a group level. Detailed information may include, apart from summary information, group rating information according to each user, group use pattern information and group history information but may exclude detailed starting points, destinations and personal information of members. Thus, since a group level and rating information of each user are opened to at least a user of the group, users have no choice but to make the above-described effort to finely use a moving object. That is, as users belonging to a user group cannot help being conscious of reputations between them, the users use a moving object in a fine manner. Thus, the utilization rate of a moving object may be refrained from being lowered, and the management burden of a fleet system may be reduced.

Figure 16:
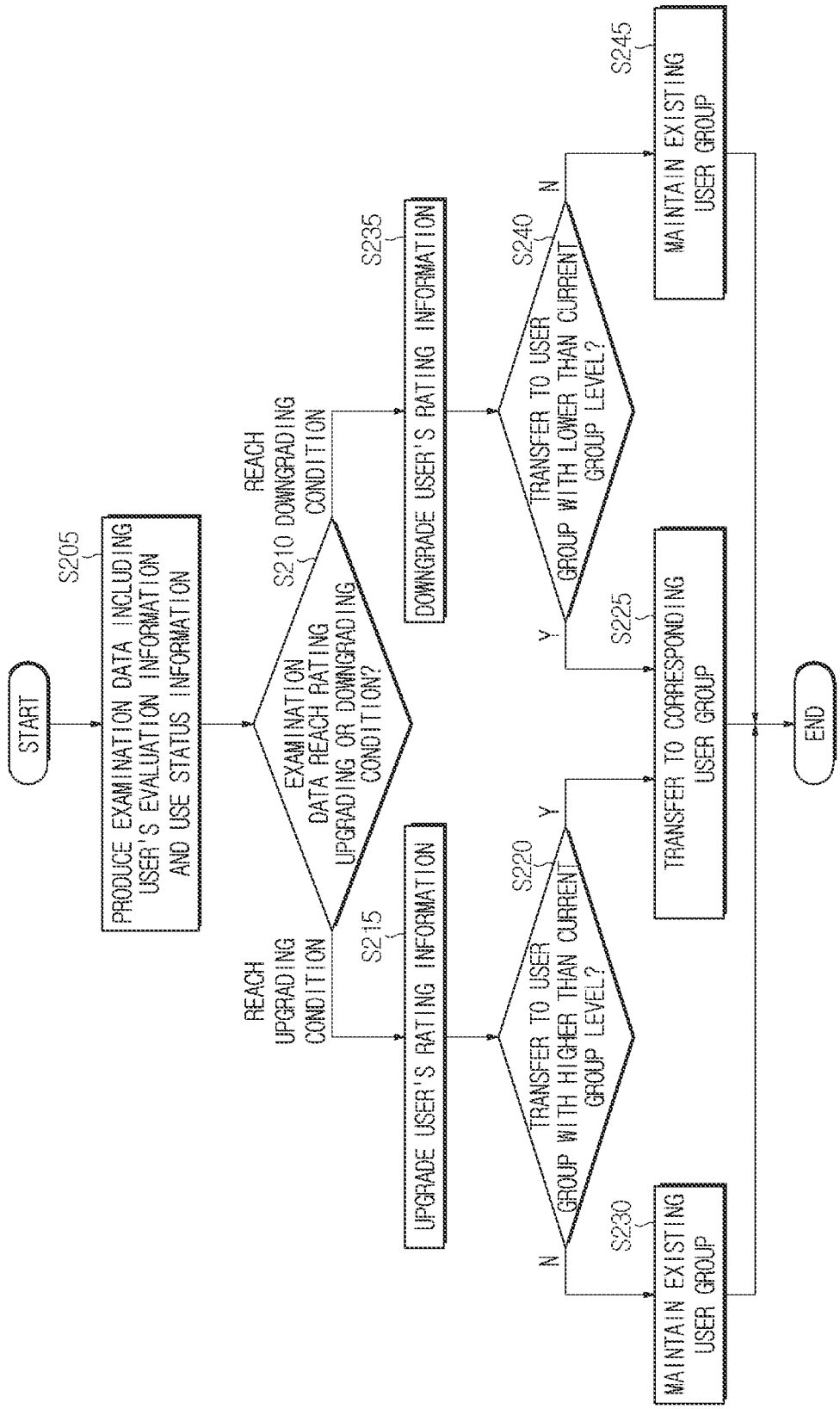
FIG. 16 is a flowchart illustrating a method in which a user is changed to another group, in accordance with an embodiment of the present disclosure.

FIG. 16 is a flowchart illustrating a method in which a user is changed to another group, in accordance with an embodiment of the present disclosure.

The server 200 may generate new evaluation information by accumulating evaluation information for a user of a user group and may produce examination data of the user based on evaluation information and use status information (S205). Based on the examination data, the server 200 may determine whether rating information reaches an upgrading condition or a downgrading condition (S210).

When the upgrading condition is reached (Y of S210), the server 200 may upgrade a user's rating information and may determine whether or not transfer to a user group with a higher level than a current group level is possible according to an upgraded level (S220). When the determination concludes that transfer is possible, the server 200 may transmit to the user device 100 an inquiry message regarding whether or not to transfer to the user group with a high level corresponding to the upgraded level. When the user device 100 approves the transfer by designating a specific high-level group, the server 200 may notify a change into the user group to the user device 100 (S225). When the determination concludes that transfer is not possible (N of S220), the server 200 may keep the user's information as the current user group (S230).

On the other hand, when the downgrading condition is reached (N of S210), the server 200 may downgrade the user's rating information (S235). According to the downgraded level, it may be determined whether or not the user's rating information is to be transferred to a user group with a lower group level than the current group level (S240). When the determination concludes that the transfer is possible, the server 200 may transfer the user information to a user group corresponding to the downgraded level and may change user and moving object group information (S225). When the determination concludes that the transfer is not possible (N of S240), the server 200 may keep the user's information in the current user group (S230).

Figure 17:
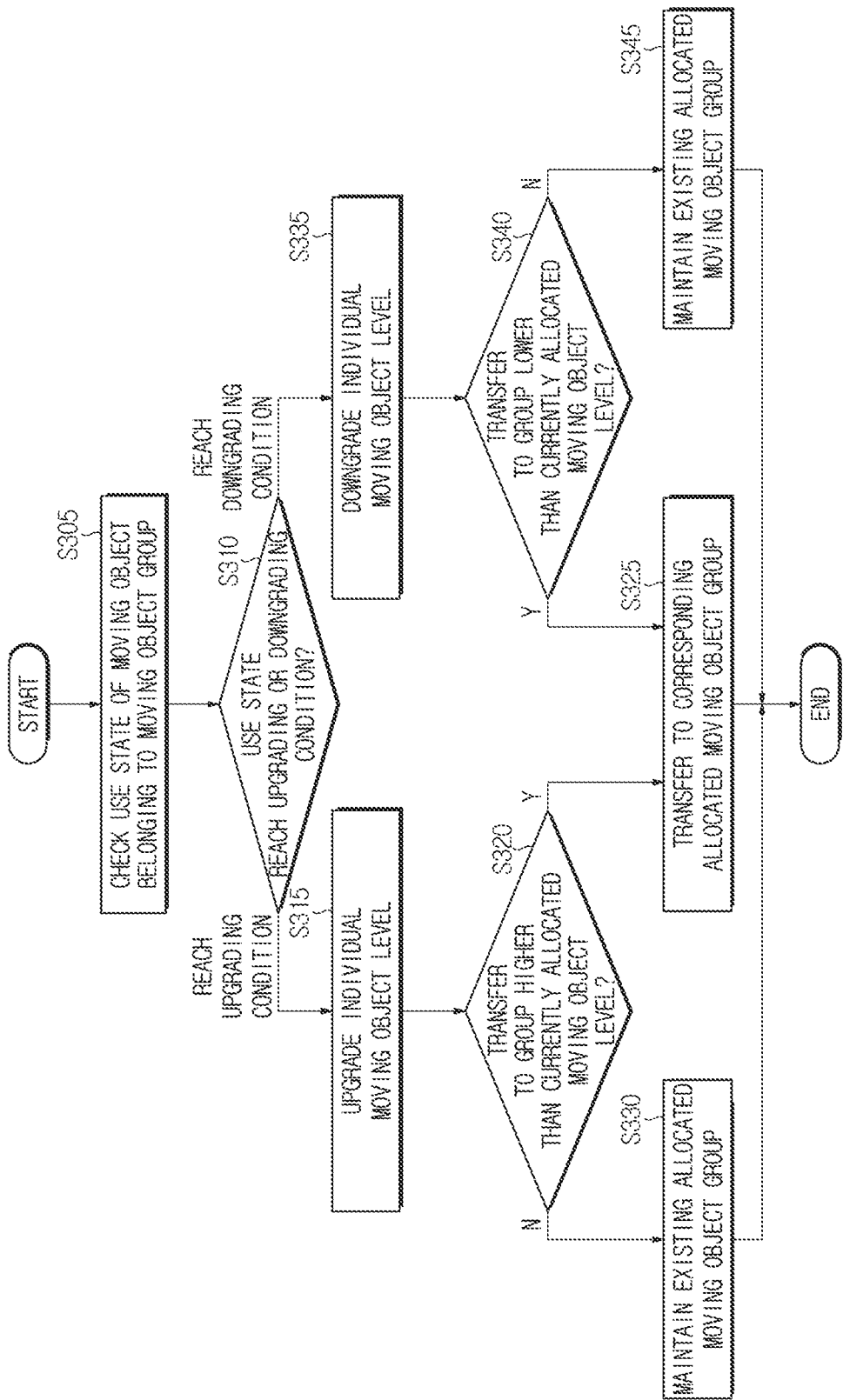
FIG. 17 is a flowchart illustrating a method in which a moving object is changed from an existing allocated moving object level to another level, in accordance with an embodiment of the present disclosure.

FIG. 17 is a flowchart illustrating a method in which a moving object is changed from an existing allocated moving object level to another level, in accordance with an embodiment of the present disclosure. Although the present embodiment is described to be implemented by the server 200, as the moving object 300 includes moving object group information as well as moving object state information, the moving object 300 may implement the present embodiment and then may transmit a processing result to the server 200.

The server 200 may check use state of the moving object 300 based on evaluation basis information of the moving object 300 belonging to a moving object group that provides exclusive use (S305).

Use state of an individual moving object may be analyzed based on the cleanliness of the moving object, damage caused by an accident, and a degree of wear of components. When a user or a maintenance center changes a seat or mat to improve cleanliness, performs thorough cleansing, replaces consumables or performs repair work for damage, the use state may be upgraded. Poor cleanliness, drastic increase in the degree of wear of components and damage of the moving object may cause the use state to be downgraded.

The server 200 may determine whether use state reaches an upgrading or downgrading condition of a moving object level (S310).

When the upgrading condition is reached, the server 200 may upgrade a level of a corresponding moving object (S315) and may determine whether or not transfer to a user group with a higher level than a current group level is possible according to an upgraded level (S320). When the transfer is possible for such a reason as a decrease in the number of moving objects in a moving object group with a high level or the need to increase the number of moving objects, the server 200 may transfer the moving object 300 to a moving object group with a high level corresponding to the upgraded level and may notify information on the moving object group thus changed and a corresponding user group to the moving object 300 (S325). Accordingly, an individual moving object may be managed so that the moving object may be provided to a user group with a high group level. When the determination concludes that the transfer is not possible (N of S320), the server 200 may keep information of the moving object in the current user group (S330).

On the other hand, when the downgrading condition is reached, the server 200 may downgrade the level of the moving object (S335). According to the downgraded level, the server 200 may determine whether or not transfer to a user group lower than a current level is possible (S340).

When the transfer is possible as the number of moving objects belonging to a moving object group with the current level is not below a threshold value or for any other reason (Y of S340), the server 200 may transfer information of the moving object into a moving object group corresponding to the downgraded level and may notify information on the moving object group information thus changed and corresponding user group information to the moving object 300 (S325). Accordingly, an individual moving object may be managed so that the moving object may be provided only to a user group with a low group level. In another embodiment, although the number of moving objects belonging to a moving object group with the current level is not below a threshold value, for the convenience of a user group before transfer, the server 200 may set that a user group, which used the moving object before transfer, is capable of using the moving object after transfer.

When the determination concludes that the transfer is not possible (N of S340), the server 200 may keep information of the moving object in the current user group (S345).

Figure 18:
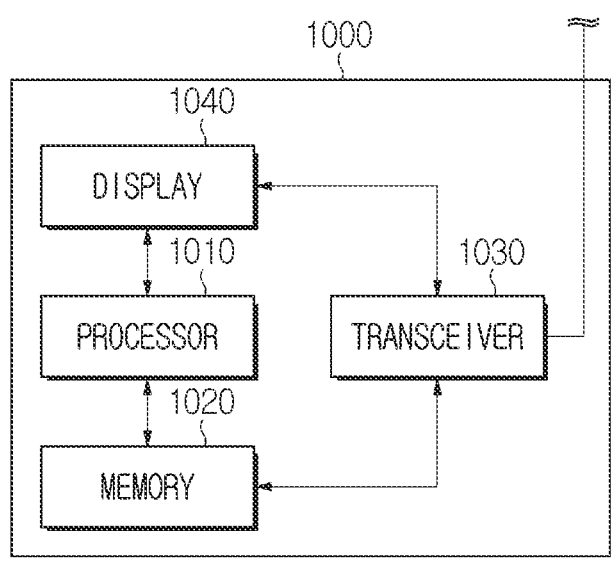
FIG. 18 is a view illustrating a device configuration according to an embodiment of the present disclosure.

FIG. 18 is a view illustrating a device configuration according to an embodiment of the present invention. Referring to FIG. 18, a device may include at least one or more among the above-described moving object, a device, a server and an RSU. In other words, the device may communicate and work with another device, which is not limited to the above-described embodiment. As an example, for the above-described operation, a device 1000 may include one or more among a processor 1010, a memory 1020, a transceiver 1030 and a display 1040. That is, the device may include a configuration necessary to communicate with another device or may display a data processing result between each other. In addition, as an example, the device may include other configurations than the above-described configuration. That is, the device may have a configuration, which includes the above-described device for communicating with another device but is not limited thereto, and may be a device operating based on what is described above.

Although the exemplary methods of the present disclosure described above are represented by a series of acts for clarity of explanation, they are not intended to limit the order in which the steps are performed, and if necessary, each step may be performed simultaneously or in a different order. In order to implement a method according to embodiments of the present disclosure, the illustrative steps may include an additional step or exclude some steps while including the remaining steps. Alternatively, some steps may be excluded while additional steps are included.

The various embodiments of the disclosure are not intended to be all-inclusive and are intended to illustrate representative aspects of embodiments of the disclosure, and the features described in the various embodiments may be applied independently or in a combination of two or more.

In addition, the various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays (FPGAs), a general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

What is claimed is:

1. A method for allocating a moving object for a fleet system that includes a server to execute processing to provide a shared service of the moving object, the method comprising:

receiving, by the server, a use request for the moving object from a user device belonging to a user group, wherein the user group is a collection of multiple users and is associated with a predetermined moving object level among a plurality of moving object levels;

presenting, by the server, an available moving object list in compliance with the use request, among moving objects belonging to the predetermined moving object level corresponding to the user group, wherein:

the moving objects are classified into one of moving object groups that is associated with the predetermined moving object level, the one of moving object groups is at least partially exclusive to the user group, and the moving object group corresponding to the moving object is upgraded or downgraded based on whether a use state of the moving object reaches an upgrading condition or downgrading condition of the moving object level corresponding to the moving object; and allocating, by the server, the moving object to the user device according to information of the moving object that is selected by the user device from the available moving object list to enable a user associated with the user device to utilize the moving object.

2. A fleet system that is implemented by a computing device, the fleet system comprising:

a user device registered to the fleet system;

a moving object registered to the fleet system; and a server configured to:

manage the fleet system to execute processing to provide a shared service of the moving object;

receive a use request of the moving object from the user device belonging to a user group, wherein the user group is a collection of multiple users and is associated with a predetermined moving object level among a plurality of moving object levels;

present an available moving object list in compliance with the use request, among moving objects belonging to the moving object level corresponding to the user group, wherein a moving object group corresponding to the moving object is upgraded or downgraded based on whether a use state of the moving object reaches an upgrading condition or downgrading condition of the moving object level corresponding to the moving object; and allocate the moving object to the user device according to moving object information selected by the user device from the available moving object list to enable a user associated with the user device to utilize the moving object.

3. The method of claim 1, wherein:

information associated with the user group and information associated with the moving object group are recorded or stored in the moving object; and the moving object provides the information associated with the user group and the information associated with the moving object group to the user device.

4. The method of claim 1, wherein:

presenting the available moving object list is performed based on user rating information and a user group level which are assigned to the user device; and when the user rating information is lower than a lower bound of normal use, the available moving object list is generated by excluding a portion of available moving objects belonging to the moving object level.

5. The method of claim 4, further comprising:

determining whether the user rating information assigned to the user device is capable of using a moving object with a higher level than the moving object level, when the use request requests the moving object with the higher level than the predetermined moving object level; and presenting the available moving object list comprising the moving object with the higher level, when the moving object with the higher level is available.

6. The method of claim 1, wherein:

the user group comprises different benefit information according to each group level; and the benefit information is information available to the user group and includes at least one of moving object type information, moving object state information, or information on a zone for holding the moving object in a fleet spot.

7. The method of claim 1, further comprising:

receiving a generation request of the user group;

determining a user group level and a moving object level based on rating information assigned to user devices, which are selected as candidates of the user group, and approving the user group; and notifying information associated with an approved user group to the user device.

8. The method of claim 7, wherein receiving the generation request of the user group comprises receiving information on a user, who is to subscribe to the user group at a request of the user device, and the rating information.

9. The method of claim 8, wherein the generation request further comprises use type information on a use method of the moving object.

10. The method of claim 7, further comprising generating user group recommendation information, which comprises a user other than users, who are to subscribe to the user group, and presenting the information to the user device, when it is determined, in the receiving of the generation request of the user group, that a number of users, who are to subscribe to the user group at the request of the user device, is less than a minimum number.

11. The method of claim 7, wherein:

approving the user group further comprises determining an at least partially exclusive moving object group in compliance with the moving object level; and notifying the user device further comprises transmitting the information associated with the user group to the exclusive moving object group.

12. The method of claim 7, further comprising:

receiving a subscription request for the approved user group at a request of another user device;

determining whether the another user device performs processing of a special condition for subscribing to the approved user group, when a level of the approved user group is higher than rating information assigned to the another user device; and transmitting group subscription approval information to the another user device, when it is determined that the another user device performs the processing.

13. The method of claim 1, further comprising:

receiving a use end request of the moving object, after allocating the moving object;

generating evaluation information based on evaluation basis information received from the moving object or the user device;

updating rating information assigned to the user device based on the evaluation information and use status information on a use condition of the moving object;

updating a level of the user group according to the updated rating information;

modifying the information associated with the user group according to the updated level of the user group; and notifying the modified information to the user device or the moving object.

14. The method of claim 13, wherein:

the evaluation basis information comprises at least one of use severity data of the moving object, after-use cleanliness data of the moving object, maintenance data of the moving object, accident data, or evaluation data of a subsequent user;

data of the evaluation basis information is detected or recorded by the moving object; and the use status information comprises contract information of a user registered in the fleet system.

15. The method of claim 13, further comprising providing the information associated with the user group to a user device not belonging to the user group, wherein the information provided to the user device not belonging to the user group is summary information, and information associated with the user group, which is provided to the user device of the user group, is detailed information.

16. The method of claim 1, further comprising:

generating evaluation information for a user of the user group;

producing examination data of the user based on the evaluation information and use status information on a use condition of the moving object;

determining whether rating information reaches an upgrading or downgrading condition, based on the examination data; and notifying, to the user device, a change to a user group lower than a current group level, when the downgrading condition is reached.

17. The method of claim 1, wherein the moving object belonging to the moving object level is set as a moving object belonging to a moving object group at least partially exclusive to the user group, the method further comprising:
  checking a use state of the moving object based on evaluation basis information of the moving object;
  determining whether the use state reaches an upgrading or downgrading condition of the moving object level; and
  transferring the moving object to a group higher than a level of a current moving object group, when the upgrading condition is reached.

18. The method of claim 17, further comprising transferring the moving object to a group lower than the level of the current moving object group, when the downgrading condition is reached, wherein a user group using the moving object before the transferring is set to be capable of using the moving object after the transferring.

19. A computing device for a fleet system allocating a moving object based on a user group comprising a collection of multiple users and is associated with a predetermined moving object level among a plurality of moving object levels, the computing device, which executes processing to provide a shared service of the moving object, comprising:
  a transceiver configured to transmit and receive a signal; and
  a processor configured to:
    control the transceiver;
    receive a use request of the moving object from a user device belonging to the user group;
    present an available moving object list in compliance with the use request, among moving objects belonging to the predetermined moving object level corresponding to the user group,
    wherein:
      the moving objects are classified into one of moving object groups that is associated with the predetermined moving object level,
      the one of moving object groups is at least partially exclusive to the user group, and
      the moving object group corresponding to the moving object is upgraded or downgraded based on whether a use state of the moving object reaches an upgrading condition or downgrading condition of the moving object level corresponding to the moving object; and
  allocate the moving object to the user device according to moving object information selected by the user device from the available moving object list to enable a user associated with the user device to utilize the moving object.

* * * * *